United States Patent
Sakaguchi et al.

(10) Patent No.: US 10,893,210 B2
(45) Date of Patent: Jan. 12, 2021

(54) IMAGING APPARATUS CAPABLE OF MAINTAINING IMAGE CAPTURING AT A SUITABLE EXPOSURE AND CONTROL METHOD OF IMAGING APPARATUS

(71) Applicant: CANON KABUSHIKI KAISHA, Tokyo (JP)

(72) Inventors: Takeshi Sakaguchi, Inagi (JP); Koji Inoue, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 233 days.

(21) Appl. No.: 15/944,963

(22) Filed: Apr. 4, 2018

(65) Prior Publication Data
US 2018/0295269 A1 Oct. 11, 2018

(30) Foreign Application Priority Data

Apr. 7, 2017 (JP) ................................ 2017-076914

(51) Int. Cl.
*H04N 5/235* (2006.01)
*H04N 5/232* (2006.01)
(Continued)

(52) U.S. Cl.
CPC ....... *H04N 5/2353* (2013.01); *H04N 5/23212* (2013.01); *H04N 5/341* (2013.01); *H04N 5/343* (2013.01); *H04N 5/353* (2013.01); *H04N 5/3532* (2013.01); *H04N 5/3535* (2013.01); *H04N 5/36961* (2018.08); *H04N 9/04551* (2018.08)

(58) Field of Classification Search
CPC .................................................. H04N 5/36961
See application file for complete search history.

(56) References Cited

U.S. PATENT DOCUMENTS

| 10,218,894 | B2* | 2/2019 | Koizumi | H04N 5/2353 |
| 2012/0147165 | A1* | 6/2012 | Yoshino | H04N 7/183 |
| | | | | 348/65 |
| 2015/0373250 | A1* | 12/2015 | Sfaradi | G03B 13/36 |
| | | | | 348/345 |

FOREIGN PATENT DOCUMENTS

| JP | 09-230225 A | 9/1997 |
| JP | 2015-068959 A | 4/2015 |
| JP | 2015-148819 A | 8/2015 |

OTHER PUBLICATIONS

The above foreign patent document was cited in the Nov. 24, 2020 Japanese Office Action, a copy of which is inclosed without an English Translation, that issued in Japanese Patent Application No. 2017-076914.

* cited by examiner

*Primary Examiner* — Gary C Vieaux
(74) *Attorney, Agent, or Firm* — Cowan, Liebowitz & Latman, P.C.

(57) ABSTRACT

Provided is an imaging apparatus including: a plurality of pixels; a scan unit configured to perform a first scan that outputs, from a first pixel of the plurality of pixel, a first signal based on a light flux that has passed through a first region of an exit pupil of imaging optics and a second scan that outputs, from a second pixel of the plurality of pixels, a second signal based on a light flux that has passed through a second region that is a part of the first region; a determination unit configured to determine whether or not to set a second exposure time of the second pixel to be shorter than a first exposure time of the first pixel; and an exposure time setting unit configured to set the first exposure time and the second exposure time based on a determination result of the determination unit.

12 Claims, 21 Drawing Sheets

(51) Int. Cl.
*H04N 5/341* (2011.01)
*H04N 5/353* (2011.01)
*H04N 5/369* (2011.01)
*H04N 5/343* (2011.01)
*H04N 9/04* (2006.01)

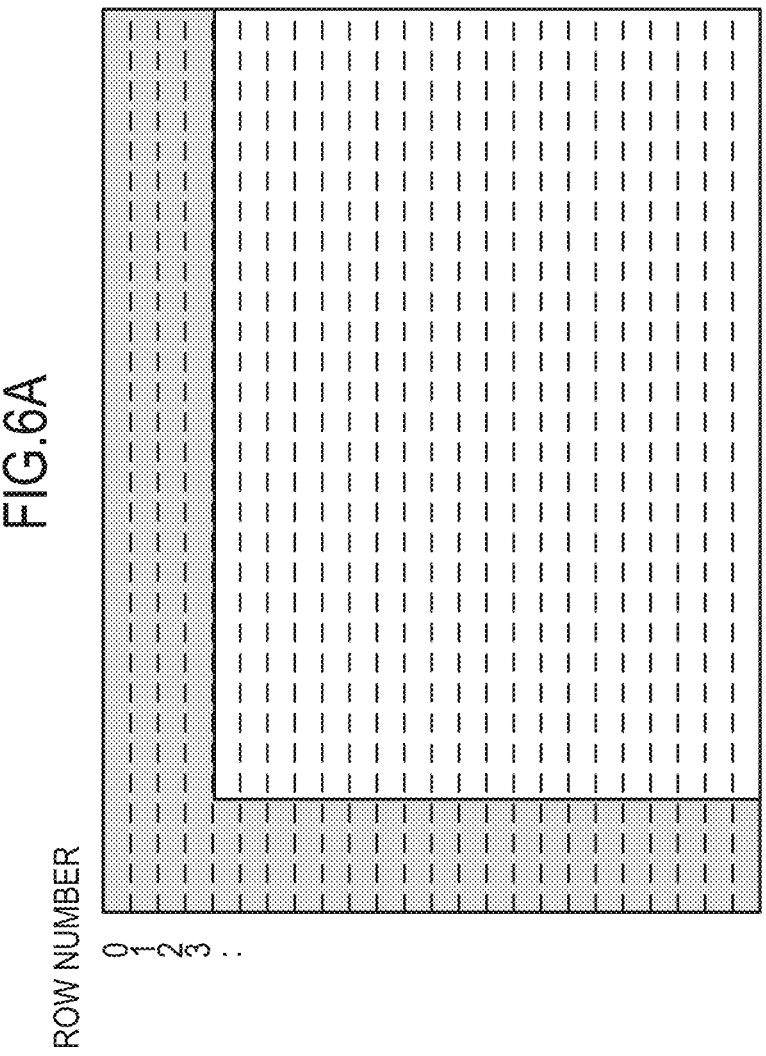

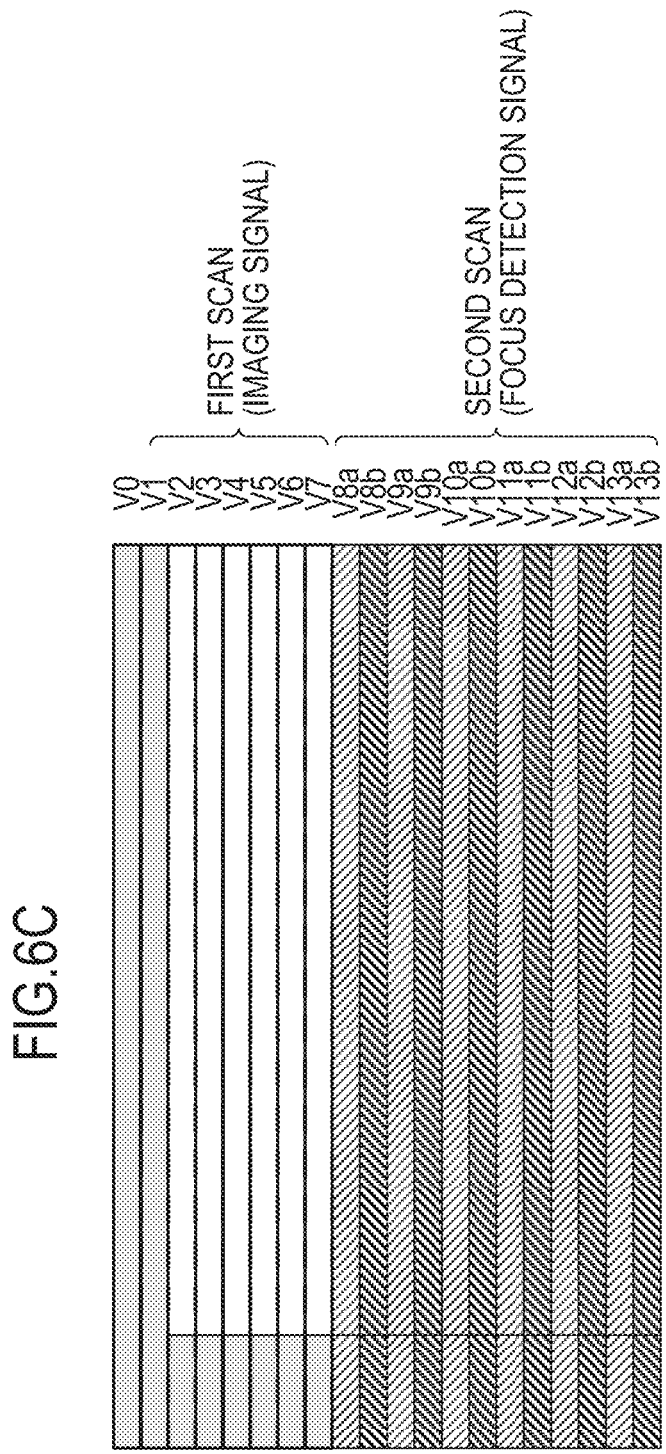

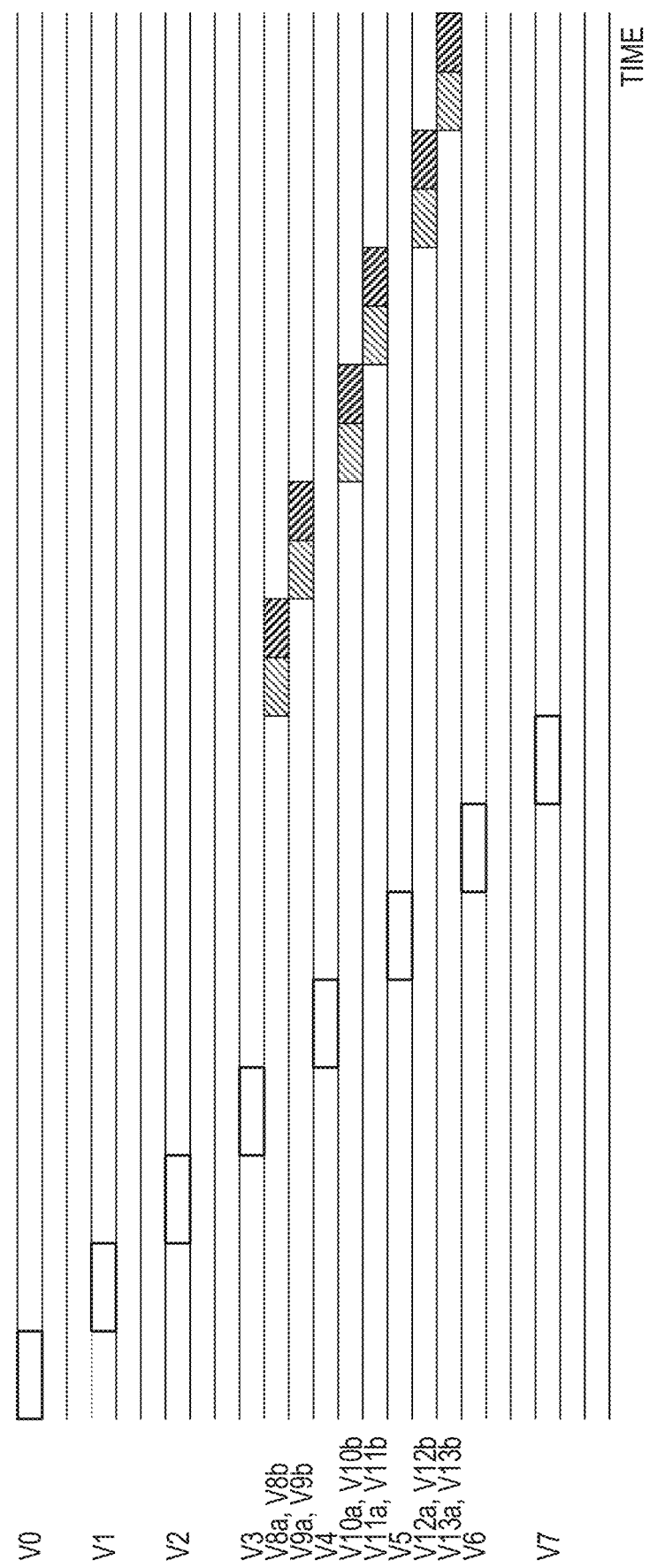

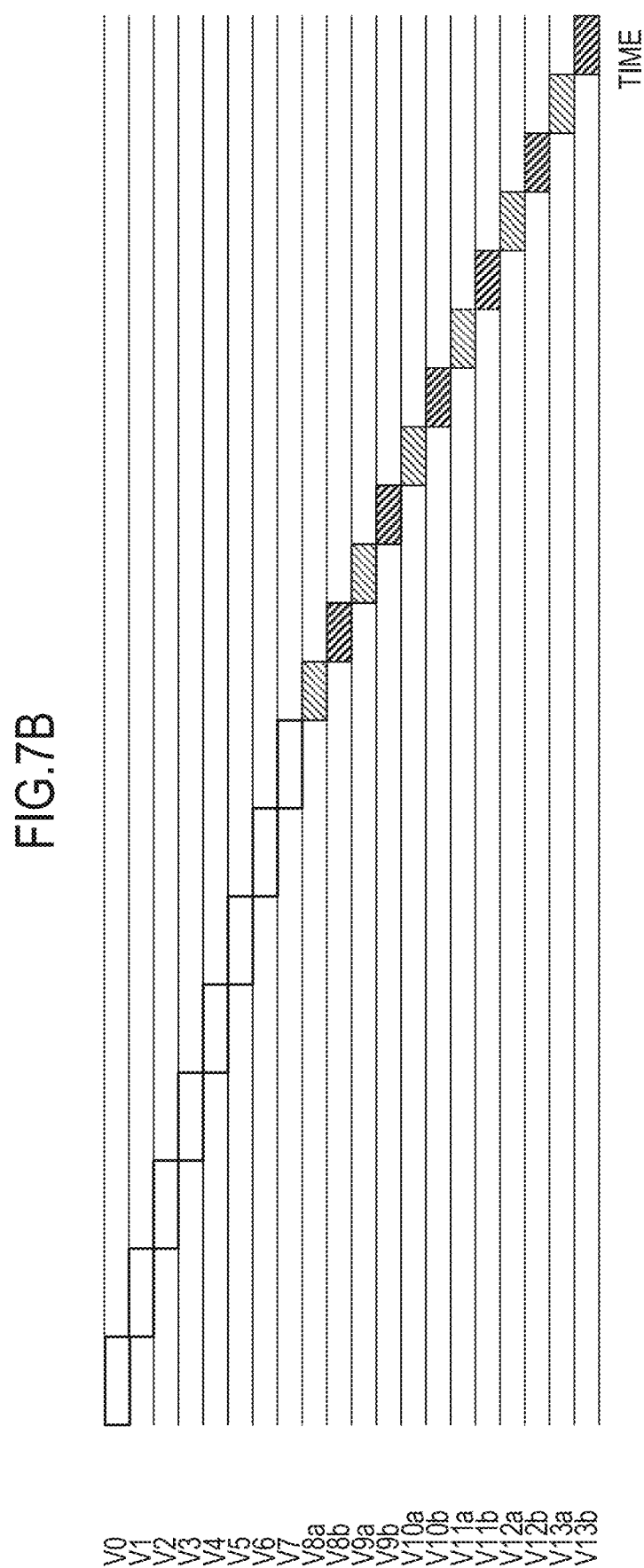

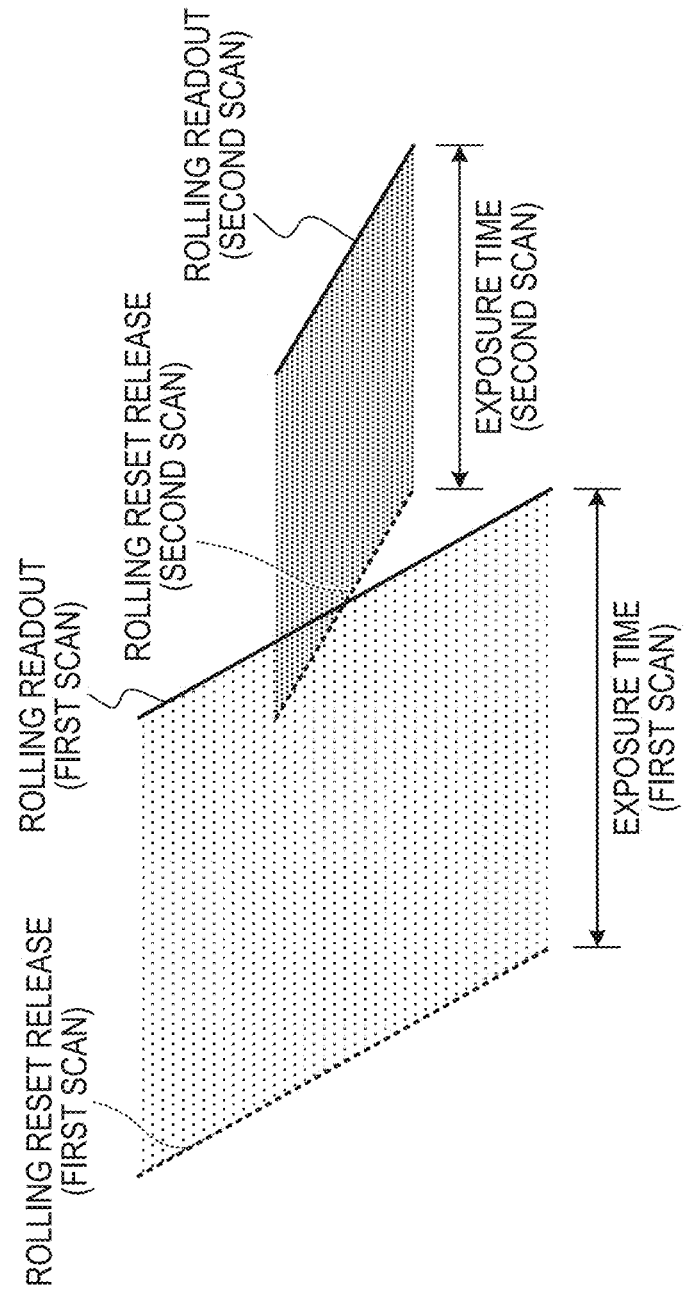

FIG.10

|  | i=0 | | i=1 | | i=2 | | i=3 | | ...... | | | | | |
|---|---|---|---|---|---|---|---|---|---|---|---|---|---|---|
| j=0 | R | Gr | R | Gr | R | Gr | R | Gr | R | Gr | R | Gr | R | Gr |
|  | Gb | B | Gb | B | Gb | B | Gb | B | Gb | B | Gb | B | Gb | B |
| j=1 | R | Gr | R | Gr | R | Gr | R | Gr | R | Gr | R | Gr | R | Gr |
|  | Gb | B | Gb | B | Gb | B | Gb | B | Gb | B | Gb | B | Gb | B |
| j=2 | R | Gr | R | Gr | R | Gr | R | Gr | R | Gr | R | Gr | R | Gr |
|  | Gb | B | Gb | B | Gb | B | Gb | B | Gb | B | Gb | B | Gb | B |
| ⋮ | R | Gr | R | Gr | R | Gr | R | Gr | R | Gr | R | Gr | R | Gr |
|  | Gb | B | Gb | B | Gb | B | Gb | B | Gb | B | Gb | B | Gb | B |
|  | R | Gr | R | Gr | R | Gr | R | Gr | R | Gr | R | Gr | R | Gr |
|  | Gb | B | Gb | B | Gb | B | Gb | B | Gb | B | Gb | B | Gb | B |
|  | R | Gr | R | Gr | R | Gr | R | Gr | R | Gr | R | Gr | R | Gr |
|  | Gb | B | Gb | B | Gb | B | Gb | B | Gb | B | Gb | B | Gb | B |

FIG.15

| AFTV − TV [UNIT OF 1/8 STEP] | β |
|---|---|
| 0 | 1 |
| 1 | 1.0625 |
| 2 | 1.1875 |
| 3 | 1.25 |
| 4 | 1.375 |
| 5 | 1.5 |
| 6 | 1.625 |
| 7 | 1.8125 |
| 8 | 2 |
| 9 | 2.125 |
| 10 | 2.375 |
| 11 | 2.5625 |
| 12 | 2.8125 |
| 13 | 3.0625 |
| 14 | 3.3125 |
| 15 | 3.625 |
| 16 | 4 |
| 17 | 4.13125 |
| 18 | 4.75 |
| 19 | 5.125 |
| 20 | 5.625 |
| 21 | 6.125 |
| 22 | 6.6875 |
| 23 | 7.3125 |
| 24 | 8 |

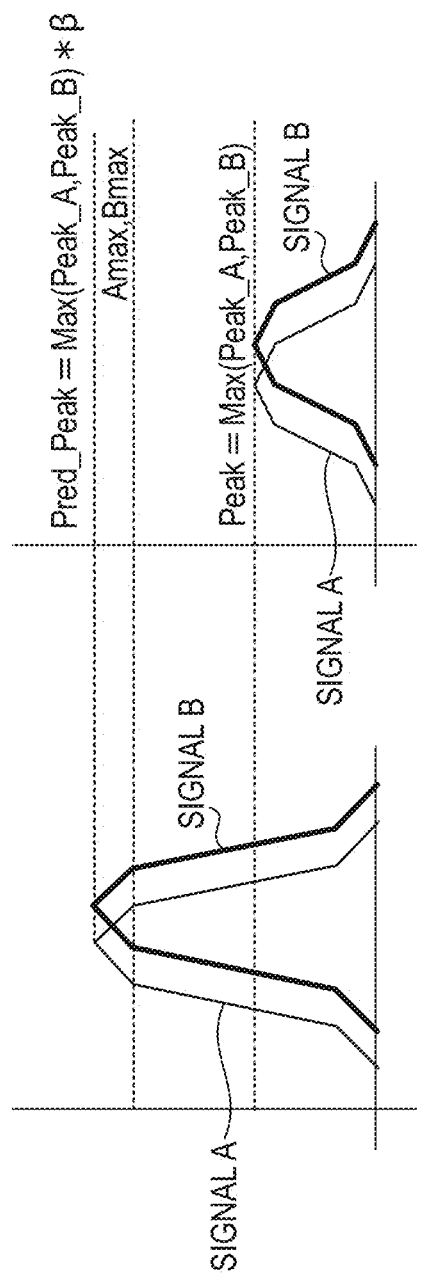

IMAGING APPARATUS CAPABLE OF MAINTAINING IMAGE CAPTURING AT A SUITABLE EXPOSURE AND CONTROL METHOD OF IMAGING APPARATUS

BACKGROUND OF THE INVENTION

Field of the Invention

The present invention relates to an imaging apparatus and a control method of the imaging apparatus.

Description of the Related Art

As one of the schemes used for focus detection of an imaging apparatus, a phase difference detection scheme is known. In the phase difference detection scheme, for example, a displacement of a pair of images formed by light fluxes that have pass through different regions of an exit pupil of imaging optics is detected, and a defocus amount can be acquired based on the displacement.

Various study has been made in order to improve the accuracy of focus detection. Japanese Patent Application Laid-Open No. 2015-148819 discloses a scheme that, in order to suppress saturation of a signal used for focus detection, acquires a signal with a lower exposure than the exposure suitable for recording an image and performs focus detection. Further, Japanese Patent Application Laid-Open No. H9-230225 discloses a scheme that reduces the accumulation time when saturation of a signal used for focus detection is detected.

In the schemes of Japanese Patent Application Laid-Open No. 2015-148819 and Japanese Patent Application Laid-Open No. H9-230225, however, image capturing may be performed with a lower exposure than the suitable exposure.

SUMMARY OF THE INVENTION

According to one aspect of the present invention, there is provided an imaging apparatus including: a plurality of pixels; a scan unit configured to perform a first scan that outputs, from a first pixel of the plurality of pixel, a first signal based on a light flux that has passed through a first region of an exit pupil of imaging optics and a second scan that outputs, from a second pixel of the plurality of pixels, a second signal based on a light flux that has passed through a second region that is a part of the first region; a determination unit configured to determine whether or not to set a second exposure time of the second pixel to be shorter than a first exposure time of the first pixel; and an exposure time setting unit configured to set the first exposure time and the second exposure time based on a determination result of the determination unit.

According to another aspect of the present invention, there is provided a control method of an imaging apparatus, the control method including: performing a first scan that outputs, from a first pixel of a plurality of pixel, a first signal based on a light flux that has passed through a first region of an exit pupil of imaging optics and a second scan that outputs, from a second pixel of the plurality of pixels, a second signal based on a light flux that has passed through a second region that is a part of the first region; determining whether or not to set a second exposure time of the second pixel to be shorter than a first exposure time of the first pixel; and setting the first exposure time and the second exposure time based on a determination result of the step of determining.

Further features of the present invention will become apparent from the following description of exemplary embodiments with reference to the attached drawings.

BRIEF DESCRIPTION OF THE DRAWINGS

FIG. 6A, FIG. 6B, and FIG. 6C are schematic diagrams illustrating drive methods of the imaging device according to the first embodiment.

FIG. 7A and FIG. 7B are schematic diagrams illustrating driving of the imaging device with respect to time elapsing according to the first embodiment.

FIG. 8 is a schematic diagram illustrating the exposure time of the imaging device according to the first embodiment.

FIG. 10 is a schematic diagram illustrating indexes provided to focus detection signals.

FIG. 15 is a table illustrating the magnification of a peak value corresponding to a difference in exposure time.

FIG. 18A and FIG. 18B are schematic diagrams illustrating calculation of a prediction peak value of a signal A and a signal B according to the second embodiment.

DESCRIPTION OF THE EMBODIMENTS

First Embodiment

Preferred embodiments of the present invention will now be described in detail in accordance with the accompanying drawings. Common reference is provided to components corresponding to each other over a plurality of drawings, and the description thereof may be omitted or simplified.

Figure 1:
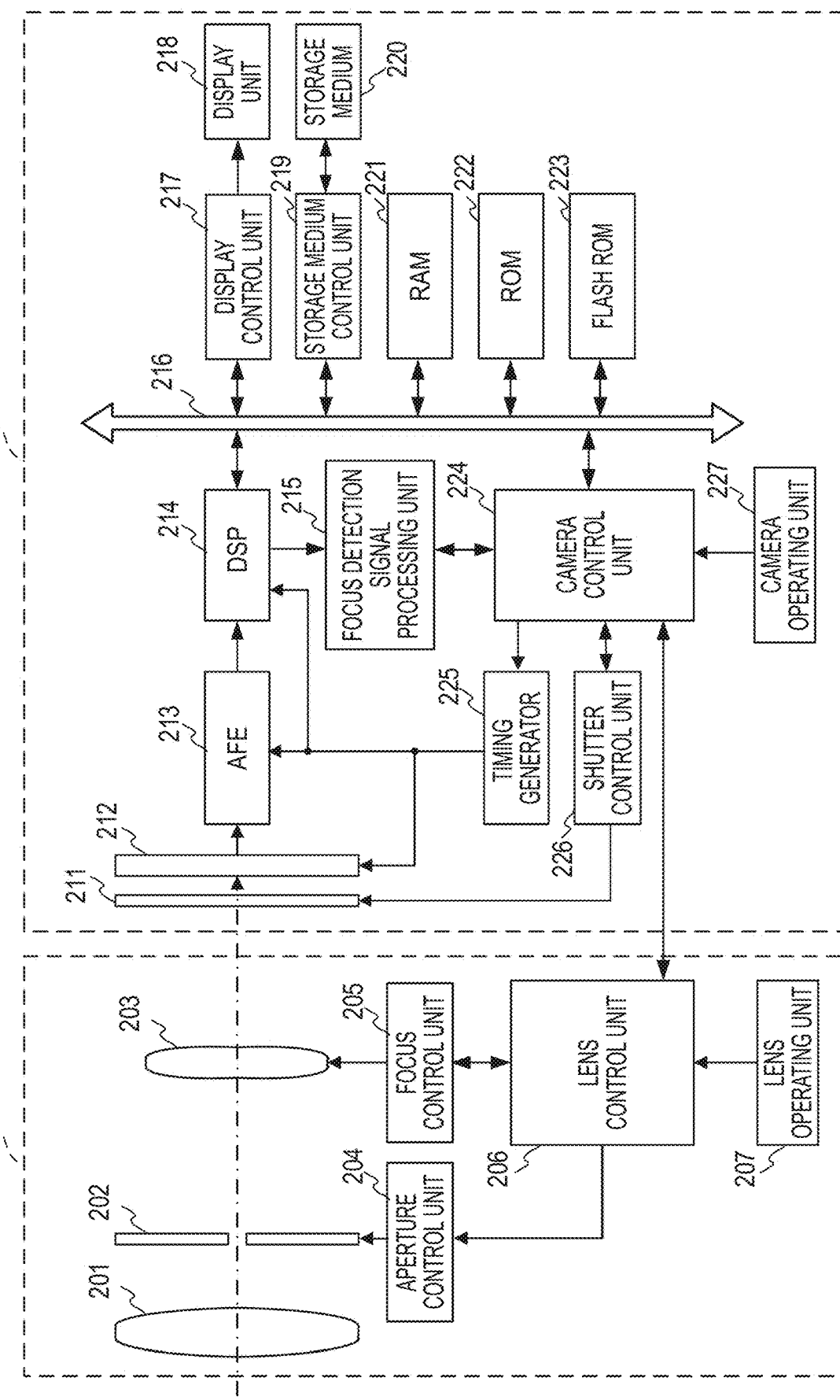
FIG. 1 is a block diagram of an imaging apparatus according to a first embodiment.

FIG. 1 is a block diagram illustrating the configuration of an imaging apparatus including a lens unit and an interchangeable lens camera body according to the first embodiment of the present invention. Note that an interchangeable lens camera body itself from which a lens unit has been removed may also be referred to as an imaging apparatus. Further, while an example of the imaging apparatus being the interchangeable lens camera is described in the present embodiment, the present invention can be applied to a lens-integrated camera in which a lens unit is integrated with a camera body, and in this case, the entire lens-integrated camera may be called an imaging apparatus.

As illustrated in FIG. 1, the imaging apparatus according to the present embodiment includes a lens unit 20 and a camera 21. First, the configuration of the lens unit 20 will be described. The lens unit 20 has a fixed lens 201, an aperture 202, a focus lens 203, an aperture control unit 204, a focus control unit 205, a lens control unit 206, and a lens operation unit 207.

The fixed lens 201, the aperture 202, and the focus lens 203 form imaging optics that guide an incident light to an imaging device 212 described later. The fixed lens 201 is a group of fixed lenses arranged on the subject side that is the closest to a subject within the lens unit 20. The aperture 202 is driven by the aperture control unit 204 and controls the amount of an incident light to the imaging device 212.

The focus lens 203 is arranged on the image plane side that is the closest to the image plane (the imaging device 212 side) within the lens unit 20. The focus lens 203 is driven in the optical axis direction by the focus control unit 205 and adjusts a focus of an incident light captured on the imaging device 212. The lens control unit 206 performs integrated control of the operations of the entire lenses. The lens control unit 206 causes the aperture control unit 204 to control the aperture amount of the aperture 202. Further, the lens control unit 206 controls the focus control unit 205 to drive the focus lens 203 and determine the position of the optical axis direction of the focus lens 203.

The lens operation unit 207 is a user interface such as a switch that accepts a user operation to the lens unit 20. In response to a user operation to the lens operation unit 207, the lens control unit 206 performs control in accordance with the user operation. Further, the lens control unit 206 controls the aperture control unit 204 and the focus control unit 205 in accordance with a control instruction or control information received from the camera control unit 224 described later. Further, the lens control unit 206 transmits lens control information (optical information) to the camera control unit 224.

Next, the configuration of the camera 21 will be described. The camera 21 acquires an imaging signal (first signal) and a focus detection signal (second signal) based on a light flux that has passed through the imaging optics. The camera 21 has a shutter 221, the imaging device 212, an analog front end (AFE) 213, a digital signal processor (DSP) 214, the camera control unit 224, a timing generator 225, and a shutter control unit 226. Further, the camera 21 has a focus detection signal processing unit 215, a bus 216, a display control unit 217, a display unit 218, a storage medium control unit 219, and a storage medium 220. Further, the camera 21 has a random access memory (RAM) 221, a read only memory (ROM) 222, a flash ROM 223, and a camera operating unit 227.

The camera control unit 224 performs integrated control on the operations of the entire camera 21. Each of the camera control unit 224 and the lens control unit 206 has an interface required for communication and can transmit and receive control signals, control information, or the like to and from each other. For example, the camera control unit 224 transmits a control signal to the lens control unit 206 via the interface and acquires lens control information (optical information) from the lens control unit 206.

Note that, when the configuration of the present embodiment is applied to an integrated-lens camera, all the functions of the lens control unit 206 may be included in the camera control unit 224. In this case, the camera control unit 224 performs integrated control on the operations of the entire integrated-lens imaging apparatus.

The shutter 211 is controlled by the shutter control unit 226 and controls whether or not to cause a light to enter the imaging device 212. The shutter 211 is used for setting the exposure time in static image capturing, for example. The imaging device 212 may be a charge couple device (CCD) image sensor, a complementary metal oxide semiconductor (CMOS) image sensor, or the like. The detail of the imaging device 212 will be described later.

A light flux that has passed through the imaging optics of the lens unit 20 (subject image) is captured on the receiving surface of the imaging device 212 and converted into signal charges in accordance with the incident light. The generated signal charges are sequentially read out from the imaging device 212 as a voltage signal (imaging signal, focus detection signal) in accordance with signal charges based on drive pulses provided from the timing generator 225 in accordance with a control signal from the camera control unit 224.

The imaging signal and the focus detection signal read out from the imaging device 212 are input to the AFE 213. The AFE 213 performs correlated double sampling (CDS) for removing a reset noise, automatic gain control (AGC), analog-to-digital conversion (ADC), clamping of a dark offset level, or the like.

The DSP 214 performs various types of a correction process, a development process, or a compression process on the imaging signal and the focus detection signal output from the AFE 213. More specifically, the DSP 214 performs a correction process of various noises occurring in the imaging device 212, detection of a defect pixel, a correction process of a defect pixel, a correction process of a focus detection signal, detection of a saturated pixel, a correction process of a saturated pixel, or the like.

Then, imaging signals processed by the DSP 214 are stored in the RAM 221 via the bus 216. The imaging signals stored in the RAM 221 are displayed on the display unit 218 that is controlled by the display control unit 217 via the bus 216. The display unit 218 may be a liquid crystal display, for example. Further, in a case of a mode of storing imaging signals, the imaging signals are stored in the storage medium 220 controlled by the storage medium control unit 219. The storage medium 220 may be a non-volatile storage medium such as a flash ROM, a hard disk, or the like, for example.

Further, focus detection signals processed by the DSP 214 are output to the focus detection signal processing unit 215. The focus detection signal processing unit 215 performs correlation operation of two (namely, a pair of) image signals used for focus detection output from the DSP 214 to calculate an image displacement. The focus detection signal processing unit 215 outputs the calculated image displacement to the camera control unit 224. The camera control unit 224 can inform the focus detection signal processing unit 215 of a setting change such as a condition of the above calculation based on the acquired image displacement. For example, such a setting change may be to set a wider area for the correlation operation when an image displacement is excessively large. Further, such a setting change may be to change the type of a bandpass filter in accordance with contrast information. Note that the imaging apparatus of the present embodiment may include at least the focus detection signal processing unit 215 and the camera control unit 224 as a device having the function of signal processing.

Further, the ROM 222 connected to the bus 216 stores therein a control program executed by the camera control unit 224, various data required for control, and the like. The flash ROM 223 connected to the bus 216 stores therein various setting information such as user setting information on the operation of the camera 21.

The camera operating unit 227 is a user interface that accepts an operation from a user. The camera operating unit 227 may include a release button, a power supply switch, a motion image recording switch, or the like. In response to a user operation input from the camera operating unit 227, the camera control unit 224 performs various camera functions such as turning on/off of the power supply, change of a setting, start of recording of a motion image, confirmation of a recorded video, or the like in accordance with the user operation. A release switch SW1 turned on by a first stroke operation (half-press operation) and a release switch SW2 turned on by a second stroke operation (full-press operation) are connected to release buttons included in the camera operating unit 227.

Figure 2:
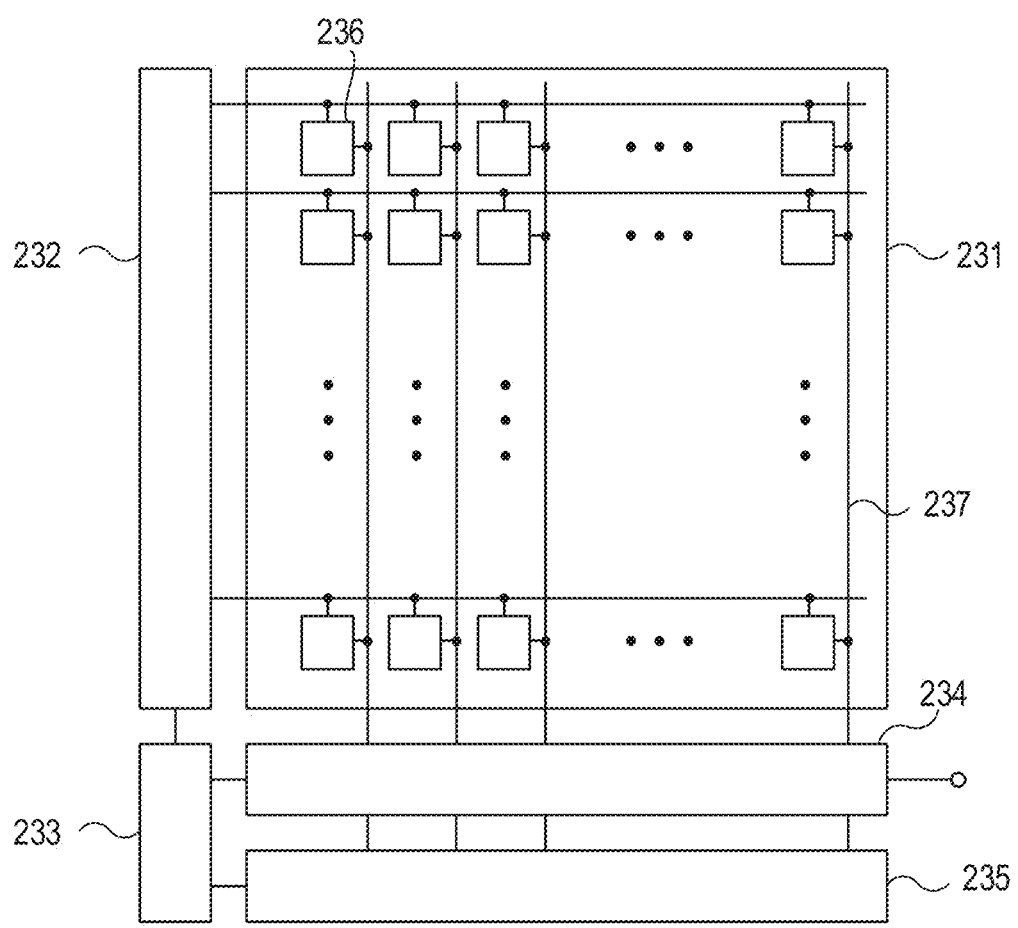
FIG. 2 is a block diagram of an imaging device according to the first embodiment.

FIG. 2 is a block diagram of the imaging device 212 according to the first embodiment. The imaging device 212 has a pixel array 231, a vertical scanning circuit 232, an interface unit 233, a readout circuit 234, and a horizontal scanning circuit 235. The pixel array 231 includes a plurality of pixels 236 arranged to form a plurality of rows and a plurality of columns. Vertical output lines 237 provided on a column basis are connected to respective pixels 236 as wirings for outputting signals.

The interface unit 233 is an interface that, in response to a drive pulse from the timing generator 225, supplies a signal indicating a drive timing based on the drive pulse to each unit of the imaging device 212. Note that the interface unit 233 may have a control function that controls each unit of the imaging device 212. The vertical scanning circuit 232 sequentially selects rows of the pixels 236 of the pixel array 231 in the vertical direction (up-down direction in the drawing) in accordance with control signals from the interface unit 233 and outputs signals to the readout circuit 234 via the vertical output lines 237 from respective pixels 236. The readout circuit 234 includes gain amplifiers, AD converters, or the like associated with respective columns of the pixels 236 and samples, on a column basis, signals output from the pixels 236 on a row selected by the vertical scanning circuit 232. The horizontal scanning circuit 235 sequentially selects signals from respective pixels 236 sampled by the readout circuit 234 in the horizontal direction (lateral direction in the drawing) and thereby outputs signals to the AFE 213.

Figure 3:
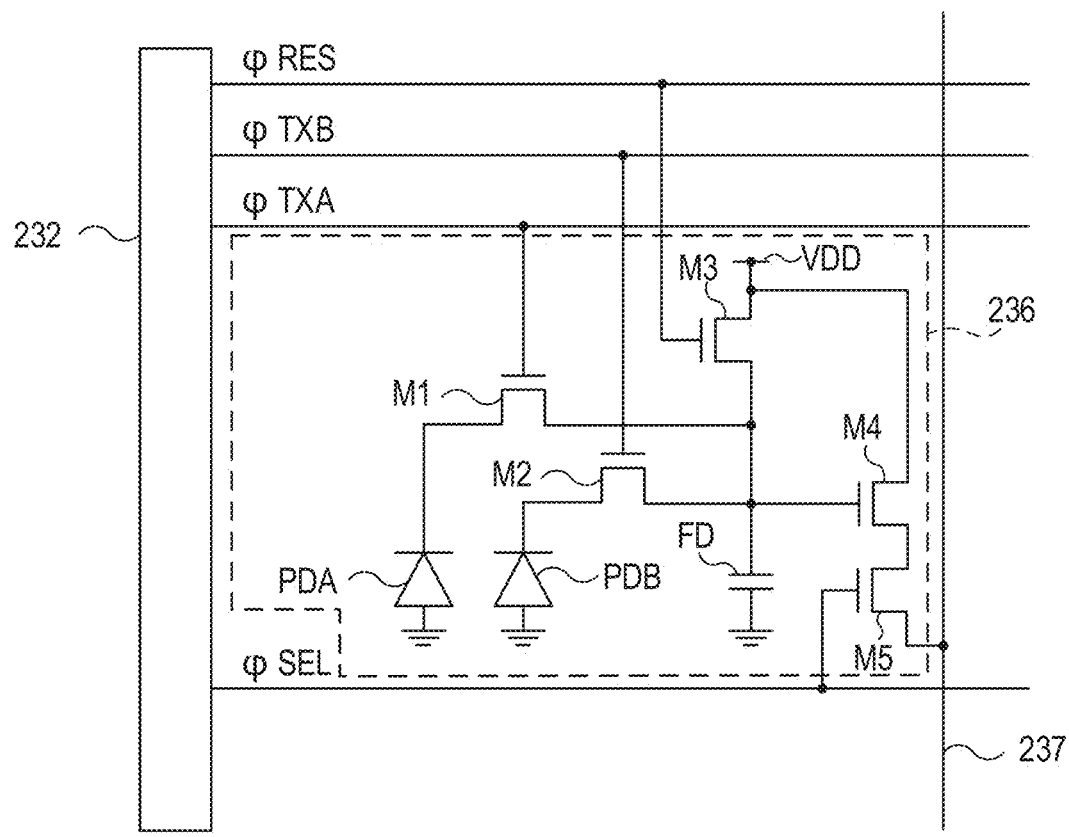
FIG. 3 is a circuit diagram of a pixel according to the first embodiment.

FIG. 3 is a circuit diagram of pixels 236 according to the first embodiment. FIG. 3 depicts one of the plurality of pixels 236 illustrated in FIG. 2, a plurality of control signal lines that supply control signals from the vertical scanning circuit 232 to the pixels 236, and the vertical output line 237. The pixel 236 has photoelectric conversion units PDA and PDB, transfer transistors M1 and M2, a reset transistor M3, an amplification transistor M4, a selection transistor M5, and a floating diffusion FD.

The photoelectric conversion units PDA and PDB each are a photoelectric conversion element such as a photodiode that generates and accumulates charges in accordance with an incident light. The transfer transistor M1 transfers charges accumulated in the photoelectric conversion unit PDA to a floating diffusion FD that is the input node of the amplification transistor M4 based on the control signal ϕTXA. The transfer transistor M2 transfers charges accumulated in the photoelectric conversion unit PDB to the floating diffusion FD that is the input node of the amplification transistor M4 based on the control signal ϕTXB. A period from the time when the photoelectric conversion units PDA and PDB start accumulation of charges in response to release of a reset state of the photoelectric conversion units PDA and PDB when the transfer transistor M1 is turned off to the time when the charges are transferred corresponds to an exposure time of the photoelectric conversion units PDA and PDB. In other words, start of accumulation of charges corresponds to a front curtain of an electronic shutter, and transfer of charges corresponds to a rear curtain of the electronic shutter. Accordingly, the imaging device 212 of the present embodiment has a pixel configuration that can drive an electronic shutter by using a scan scheme such as a rolling shutter.

The floating diffusion FD holds charges transferred via the transfer transistors M1 and M2. The reset transistor M3 resets the potential of the floating diffusion FD to a predetermined potential based on a control signal ϕRES. The selection transistor M5 controls whether or not to output a signal from the pixel 236 based on a control signal ϕSEL. When the selection transistor M5 is in an on-state, the amplification transistor M4 outputs, to the vertical output line 237 via the selection transistor M5, a signal based on the potential of the floating diffusion FD that varies in accordance with transferred charges. The drains of the reset transistor M3 and the amplification transistor M4 are connected to a power source voltage node VDD. The source of the amplification transistor M4 is electrically connected to a current source (not shown) via the selection transistor M5 and the vertical output line 237, and the amplification transistor M4 operates as a source follower circuit. That is, the amplification transistor M4 can output a signal in accordance with the potential of the floating diffusion FD connected to the gate terminal. Thereby, a signal in accordance with charges transferred to the floating diffusion FD can be read out from the vertical output line 237. Note that, while each transistor may be formed of an N-channel transistor, each transistor may be formed of a P-channel transistor.

Figure 4:
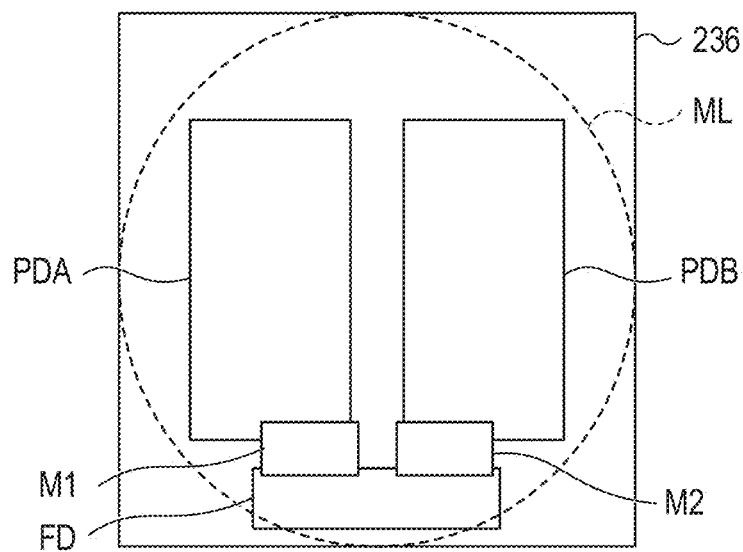
FIG. 4 is a schematic plan view of the pixel according to the first embodiment.

FIG. 4 is a schematic plan view of the pixels 236 according to the first embodiment. FIG. 4 depicts the planar structure of the photoelectric conversion units PDA and PDB, transfer transistors M1 and M2, and the floating diffusion FD and a micro-lens ML arranged over these components. Note that depiction of components other than the above included in the pixel 236 is omitted for simplified illustration. The micro-lens ML is a lens that guides an incident light to the photoelectric conversion units PDA and PDB, and one micro-lens ML is shared by the two photoelectric conversion units PDA and PDB. Note that a color filter (not shown) that selectively passes a light of a particular color is provided between the micro-lens ML and the photoelectric conversion units PDA and PDB.

Figure 5A:
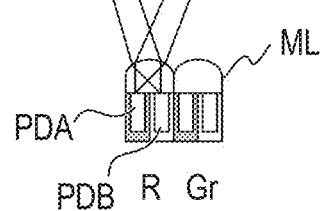
FIG. 5A and FIG. 5B are schematic diagrams illustrating the arrangement of the pixel according to the first embodiment.
Figure 5B:
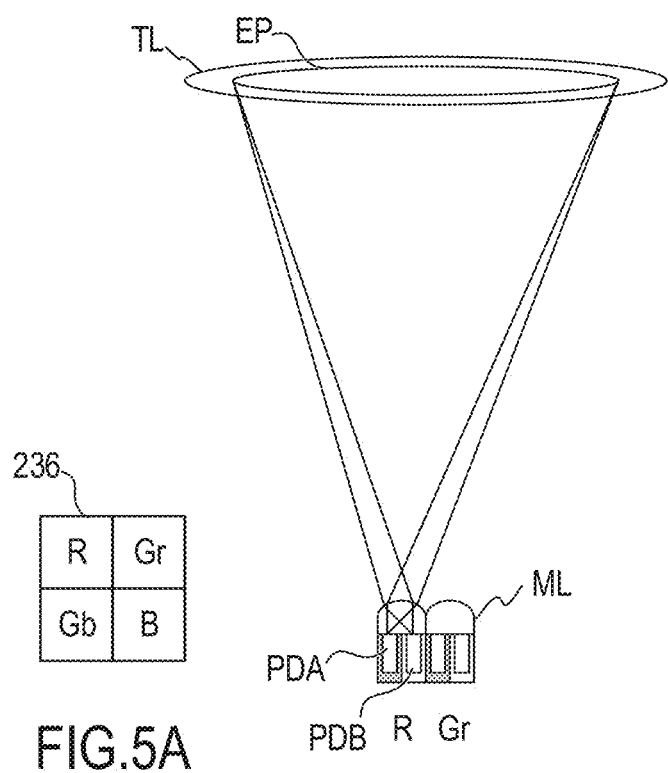

FIG. 5A and FIG. 5B are schematic diagrams illustrating the arrangement of the pixels 236 according to the first embodiment. FIG. 5A is a diagram illustrating a unit of configuration of the color arrangement of the color filter provided to the pixel 236 in the pixel array 231 according to the first embodiment. Four pixels of two rows by two columns as illustrated in FIG. 5A are defined as a unit of configuration, which is repeatedly arranged. The pixel depicted with R in FIG. 5A is an R pixel provided with a red color filter. The two pixels depicted with Gr and Gb are a Gr pixel and a Gb pixel each provided with a green color filter. The pixel depicted with B are a B pixel provided with a blue color filter. The arrangement of the pixels 236 of the present embodiment is called a primary-color Bayer arrangement.

The color filters are arranged as described above, and thereby the imaging device 212 of the present embodiment forms a two-dimensional single-plate CMOS color image sensor. Note that the colors of the color filters used in the present embodiment are not limited to the above and, for example, complementary-color filters may be used.

FIG. 5B is a schematic diagram illustrating that a light enters an R pixel illustrated in FIG. 5A. A cross section of the R pixel and the Gr pixel is illustrated in a lower part of FIG. 5B. As described above, the R pixel includes two photoelectric conversion units PDA and PDB. On the photoelectric conversion units PDA and PDB, a micro-lens ML shared by these photoelectric conversion units PDA and PDB is provided. The pixel 236 included in the imaging device 212 of the present embodiment is configured to be able to output an imaging signal used for generating an image and a focus detection signal used for focus detection by a phase difference detection scheme.

Acquisition of a focus detection signal will be described. A light flux that has passes through an exit pupil EP of imaging optics TL is divided when passing through the micro-lens ML and enters the two photoelectric conversion units PDA and PDB. The photoelectric conversion unit PDA and the photoelectric conversion unit PDB receive light fluxes that have passed through regions of the exit pupil EP, respectively, in which the regions are at least partially different. In the example illustrated in FIG. 5B, the light flux that has passed through the right side of the exit pupil EP is caused to enter the photoelectric conversion unit PDA, and the light flux that has passed through the left side is caused to enter the photoelectric conversion unit PDB.

A signal based on charges generated by the photoelectric conversion unit PDA is denoted as a signal A, and a signal based on charges generated by the photoelectric conversion unit PDB is denoted as a signal B. In this case, an image formed by the signal A and the image formed by the signal B are images displaced from each other. Since calculation of such a displacement enables focus detection, a pair of signals of the signal A and the signal B are used as a focus detection signal. More specifically, the focus detection signal processing unit 215 performs correlation calculation on the pair of signals included in a focus detection signal and performs a process of calculating an image displacement and various reliability information.

Further, when a signal obtained by adding the signal A and the signal B is denoted as a signal A+B, since the signal A+B is a signal based on a light flux that has passes through substantially the entire region of the exit pupil EP of the imaging optics TL, the signal A+B is used as an imaging signal. Substantially the entire region of the exit pupil EP corresponding to the signal A+B may be referred to as a first region. Further, a part of the region of the exit pupil EP corresponding to the signal A or a part of the region of the exit pupil EP corresponding to the signal B is a part of the first region and may be referred to as a second region.

Figure 6B:
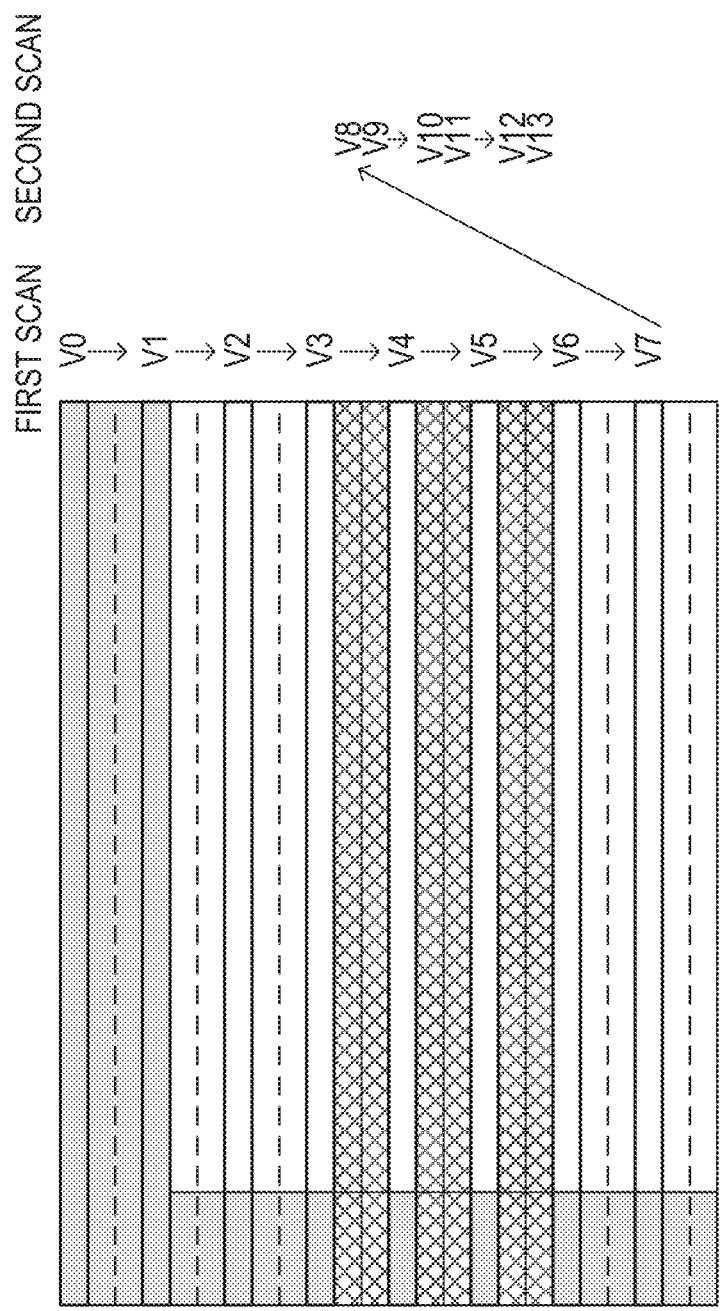

FIG. 6A, FIG. 6B, and FIG. 6C are schematic diagrams illustrating drive methods of the imaging device 212 according to the first embodiment. FIG. 6A is a schematic diagram illustrating the configuration of the pixel array 231 of the imaging device 212. The gray region on the left side and the upper side within the pixel array 231 of FIG. 6A illustrates a region where optical black pixels in which the photoelectric conversion units PDA and PDB are shielded from light are arranged. Output signals from the optical black pixels are used as a reference signal representing a state of no incident light. Further, the row numbers are provided in ascending order from the top as illustrated in the left part of FIG. 6A, and the row number on the uppermost row is 0.

FIG. 6B is a schematic diagram illustrating rows to be read out in a first scan and a second scan in a drive method of the imaging device 212. In the present embodiment, the first scan for reading out imaging signals from pixels 236 on some of the rows included in the pixel array 231 (first pixel) and the second scan for reading out focus detection signals from pixels 236 on the rows not read out in the first scan (second pixel) are performed. These scans are performed in such a way that the timing generator 225, which operates by an instruction from the camera control unit 224, supplies drive timings to the vertical scanning circuit 232 and, in response, the vertical scanning circuit 232 outputs control signals to respective pixels 236 on a row basis. In other words, each of these units functions as a scan unit that performs the first scan and the second scan.

In the example illustrated in FIG. 6B, in the first scan, readout is performed at a cycle of three rows, namely, every three rows. Such a readout method is called reduced readout. In the second scan, out of the rows within a predetermined range of the pixel array 231, readout of the rows not read out in the first scan is performed. The row V0, the row V1, the row V2, the row V3, the row V4, the row V5, the row V6, and the row V7 illustrated in FIG. 6B are rows to be read out in the first scan. The row V8, the row V9, the row V10, the row V11, the row V12, and the row V13 illustrated in FIG. 6B are rows to be read out in the second scan.

In the first scan, the signal A+B is read out as an imaging signal. In the example illustrated in FIG. 6B, first, the signal A+B is read out on the row V0, and the signal A+B is then read out on the row V1 that is a row located three rows under the row V0 with two rows being reduced after the row V0. In a similar manner, readout is performed on the row V1 to the row V7 at a three-row cycle. Note that, in the first scan, the cycle for performing readout may not necessarily be every three rows, and a reduction scheme may be set as appropriate. However, in order to suppress distortion of a generated image, it is preferable that the cycle of reduction be the same over the entire pixel array 231.

In the present embodiment, since reduction is performed in the vertical direction, when no reduction is performed in the horizontal direction, the aspect ratio of an image may be different from the aspect ratio of an actual subject. Thus, it is preferable to adjust the aspect ratio by a scheme such as performing conversion of the aspect ratio in the signal processing unit of the AFE 213, the DSP 214, or the like after readout. Further, reduced readout may be performed in the horizontal direction at the same ratio as in the vertical direction, and a process for reducing the number of signals (added and reduced readout) may be performed by adding image signals of a plurality of pixels or the like.

In the second scan performed after the first scan, the signal A and the signal B are read out on a row basis. In the example illustrated in FIG. 6B, first, the signal A is read out on the row V8. The signal B is then read out on the same row V8. Next, the signal A and the signal B are read out on the row V9 in the same manner. Then, readout on the row V10 and the row V11 is performed with reduction of the row V4 read out in the first scan. In a similar manner, readout is performed up to the row V13. Accordingly, in the second scan, two signals are read out on each row.

Note that the setting of the range of the second scan can be set as appropriate in accordance with the setting of the region in which focus detection is performed (focus detection region). The range of the second scan can be selected and set so as to include rows included in the focus detection region except rows subjected to the first scan, for example. The focus detection region may be a region designated by the user through an operation via a user interface such as the camera operating unit 227, may be a region automatically set by detecting a subject using an image recognition technology, or may be a preset fixed region.

Also in the second scan, reduced readout may be performed at a predetermined cycle. Since a longer cycle of reduction by the second scan results in a shorter readout time, it is possible to support a high-speed framerate. When the accuracy of focus detection is prioritized, however, the accuracy can be improved by reducing the cycle of reduction or reading out all the rows within the focus detection region except the rows on which to the first scan is performed.

FIG. 6C is a schematic diagram illustrating the arrangement of signals when rows are rearranged in association with the temporal order by which the signals are read out. First, the row V0 to the row V7 are read out by the first scan. In the first scan, since the imaging signals (signals A+B) are read out, an image can be generated by using these signals. Next, the row V8 to the row V13 are read out by the second scan. In the second scan, since the signal A and the signal B are read out from the same row, "a" or "b" is appended to the row number such as V8a, for example, to express distinction of the signal A and the signal B in FIG. 6C. Focus detection can be performed by acquiring an image displacement based on the signal A and the signal B on the same row.

FIG. 7A and FIG. 7B are schematic diagrams illustrating driving of the imaging device 212 with respect to time elapsing according to the first embodiment. In FIG. 7A and FIG. 7B, the horizontal axis represents time. Further, the time during which a readout operation is performed is illustrated in a rectangle frame for each row. The vertical axis of FIG. 7A represents the row number of the pixel array 231 in a similar manner to FIG. 6B. The vertical axis of FIG. 7B represents the row number rearranged in the temporal order in the same manner as FIG. 6C.

FIG. 8 is a schematic diagram illustrating the exposure time of the imaging device 212 according to the first embodiment. The vertical axis of FIG. 8 represents the row number, and the horizontal axis represents time. The illustration of "rolling readout (first scan)" and "rolling readout (second scan)" in FIG. 8 correspond to the readout scan illustrated in FIG. 7A. The illustration of "rolling reset release (first scan)" and "rolling reset release (second scan)" in FIG. 8 represent reset operations of the photoelectric conversion units PDA and PDB performed prior to readout. The period from "rolling reset release (first scan)" to "rolling readout (first scan)" is the exposure time of the pixels 236 on the rows read out in the first scan. The period from "rolling reset release (second scan)" to "rolling readout (second scan)" is the exposure time of the pixels 236 on the rows read out in the second scan.

Since the row read out in the first scan and the row read out in the second scan are different from each other, the imaging device 212 of the present embodiment can perform rolling reset release independently as illustrated in FIG. 8. Therefore, by differing the timings of rolling reset release for the rows read out in the first scan and the rows read out in the second scan, it is possible to differ respective exposure times from each other.

Note that the reason why the slope of the rolling readout in the second scan is smaller than the slope of the rolling readout in the first scan is that the time required for readout is longer in the second scan because the signal A and the signal B are read out on a single row.

Figure 9:
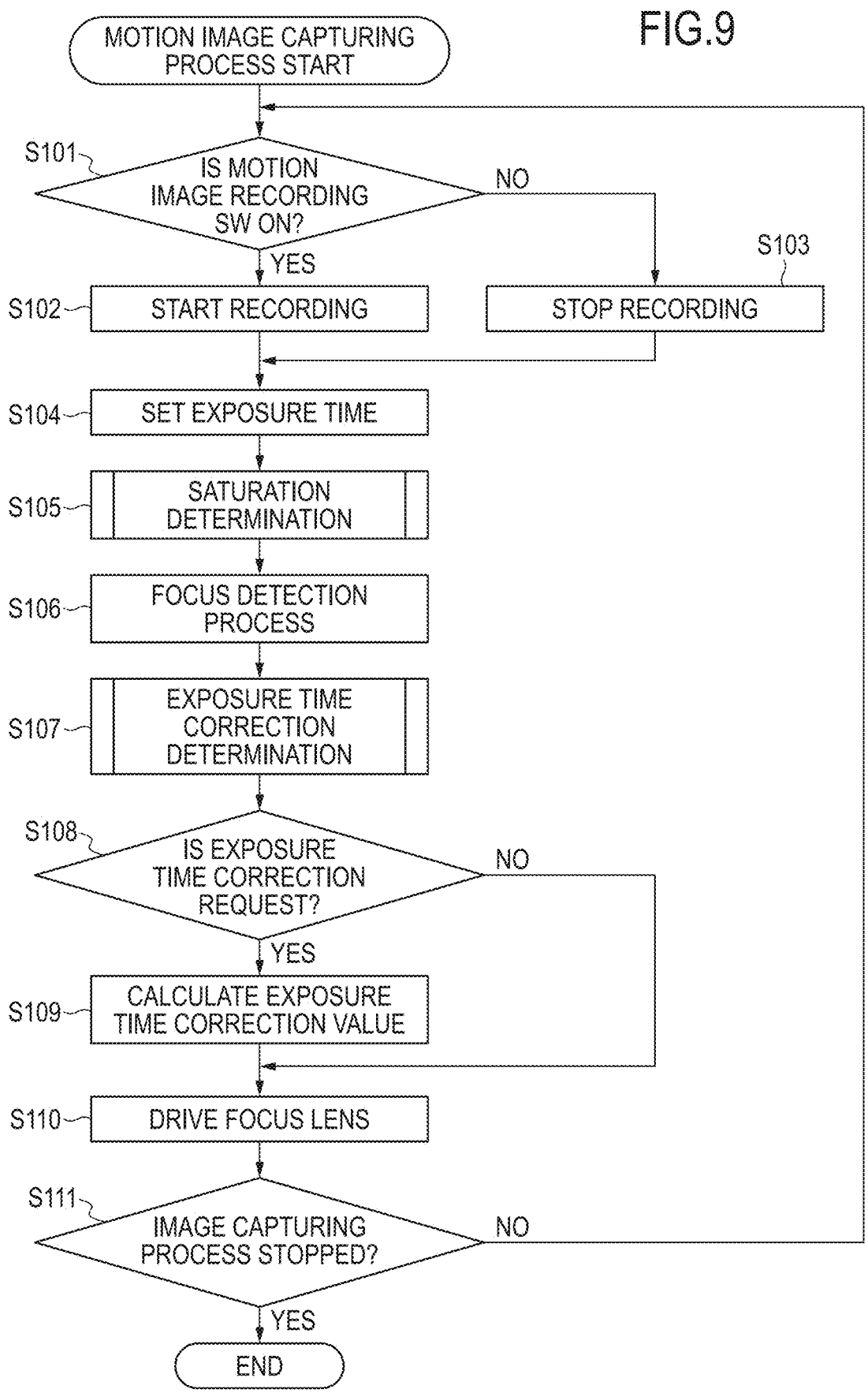
FIG. 9 is a flowchart of a motion image capturing process performed by the imaging apparatus according to the first embodiment.

Next, the operation of motion image capturing using the imaging apparatus according to the present embodiment will be described. FIG. 9 is a flowchart of a motion image capturing process performed by the imaging apparatus according to the first embodiment. In the motion image capturing of the present embodiment, motion image capturing is performed continuously, and the focus position is adjusted by driving the focus lens 203 within the lens unit 20.

In step S101, the camera control unit 224 determines whether or not a motion image recording switch (SW) included in the camera operating unit 227 is in an on-state (whether or not pressed down). If the motion image recording switch is in an on-state, the process proceeds to step S102 (step S101, YES). In step S102, the camera control unit 224 controls each unit of the imaging apparatus to start recording of a motion image. The process then proceeds to step S104. If the motion image recording switch is in an off-state, the process proceeds to step S103 (step S101, NO). In step S103, the camera control unit 224 controls each unit of the imaging apparatus to stop recording of the motion image. The process then proceeds to step S104.

With respect to step S101, while the determination is made based on whether or not the motion image recording switch is pressed down as an example in the present embodiment, the way of determination is not limited thereto. For example, the determination may be made based on an input from a user interface of other structure such as a selection switch, a touch panel, or the like, and start or stop of motion image recording may be determined by other methods.

In step S104, the camera control unit 224 that functions as an exposure time setting unit sets exposure times of the first scan and the second scan, respectively. The timing generator 225 transmits control signals to the imaging device 212 at timings so as to have the exposure time in accordance with this setting. In a normal case, the exposure times of the first scan and the second scan are set to the same. Further, this exposure time is set so that the intensity of the imaging signal is optimum. Note that, when there is an exposure time correction request in step S108 described later, the camera control unit 224 sets the exposure time of the second scan to be shorter than the exposure time of the first scan.

In step S105, the DSP 214 and the focus detection signal processing unit 215 that function as a saturation determination unit performs a saturation determination process that determines whether or not a focus detection signal read out in the second scan is saturated. Details of the saturation determination process will be described later.

In step S106, the focus detection signal processing unit 215 performs a focus detection process by acquiring an image displacement based on the signal A and the signal B forming a focus detection signal. Further, the focus detection signal processing unit 215 acquires peak values of the signal A and the signal B.

In step S107, the camera control unit 224 acquires a saturation determination result in step S105 and the peak values of the signal A and the signal B acquired in step S106. The camera control unit 224 that functions as a determination unit determines whether or not to correct the exposure time of the second scan (second exposure time) to be shorter than the exposure time of the first scan (first exposure time) based on the saturation determination result and the peak values. Details of the process of the exposure time correction determination will be described later. In the following, causing determination that the exposure time of the second scan has to be corrected to be shorter than the exposure time of the first scan is referred to as an exposure time correction request.

In step S108, the camera control unit 224 determines whether or not there is an exposure time correction request. If there is an exposure time correction request (step S108, YES), the process proceeds to step S109. If there is no exposure time correction request (step S108, NO), the process proceeds to step S110. In step S109, the camera control unit 224 calculates a correction value of a suitable exposure time so as to set the exposure time of the second scan to be shorter than the exposure time of the first scan. Note that, if there is an exposure time correction request and the exposure time correction value is calculated in step S109, an exposure time corrected based on the exposure time correction value is set in step S104 of the subsequent frame.

In step S110, the camera control unit 224 converts an image displacement acquired in step S106 into a drive amount of the focus lens 203 and transmits an instruction for driving the focus lens 203 at the drive amount to the lens control unit 206. The lens control unit 206 controls the focus control unit 205 to drive the focus lens 203 based on the instruction.

In step 111, the camera control unit 224 determines whether or not the motion image capturing process is stopped based on a user operation or the like. If the motion image capturing process is not stopped (step S111, NO), the process proceeds to step S101. If the motion image capturing process is stopped (step S111, YES), the process of the present flowchart ends.

Figure 11:
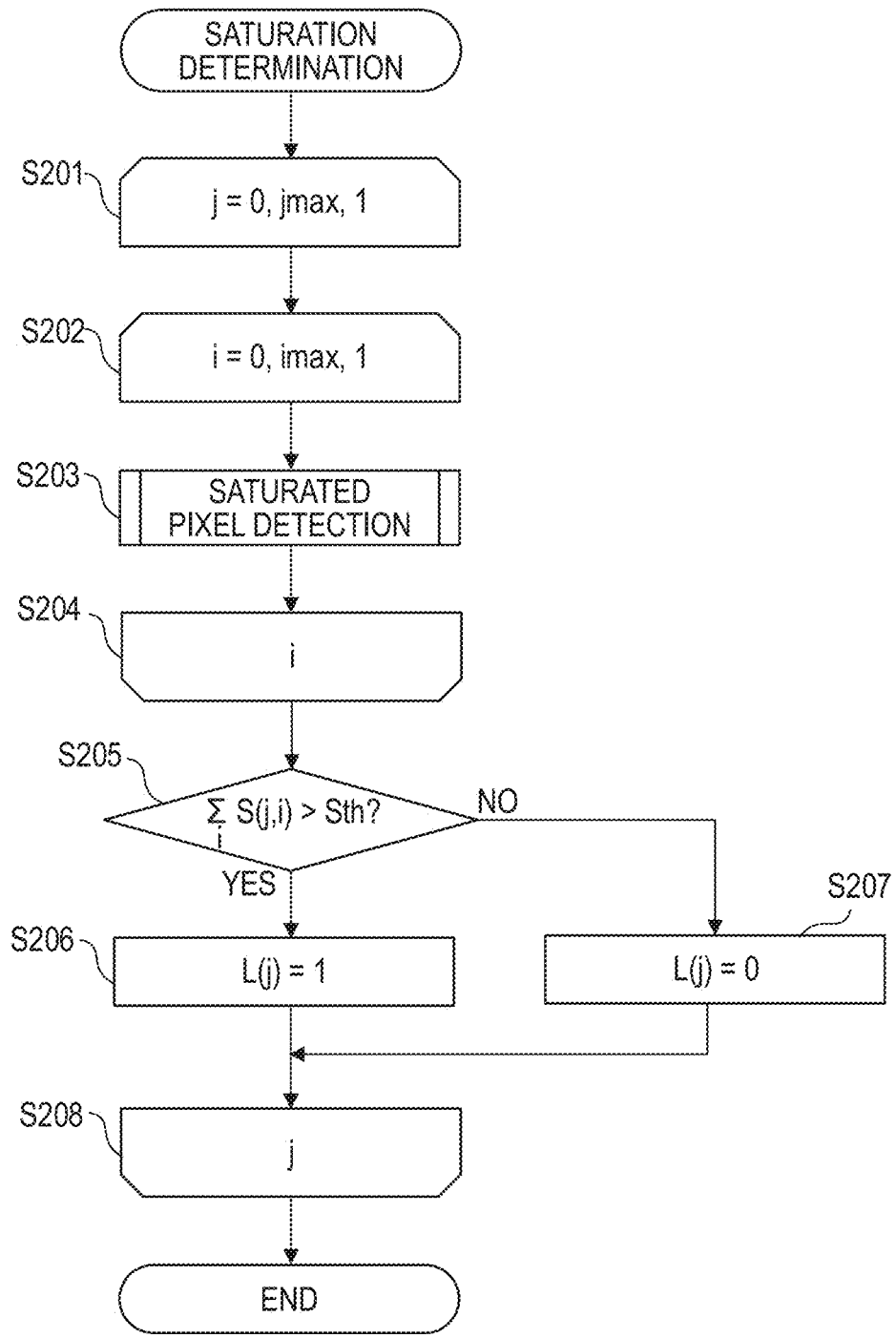
FIG. 11 is a flowchart of a saturation determination process performed by the imaging apparatus according to the first embodiment.
Figure 12:
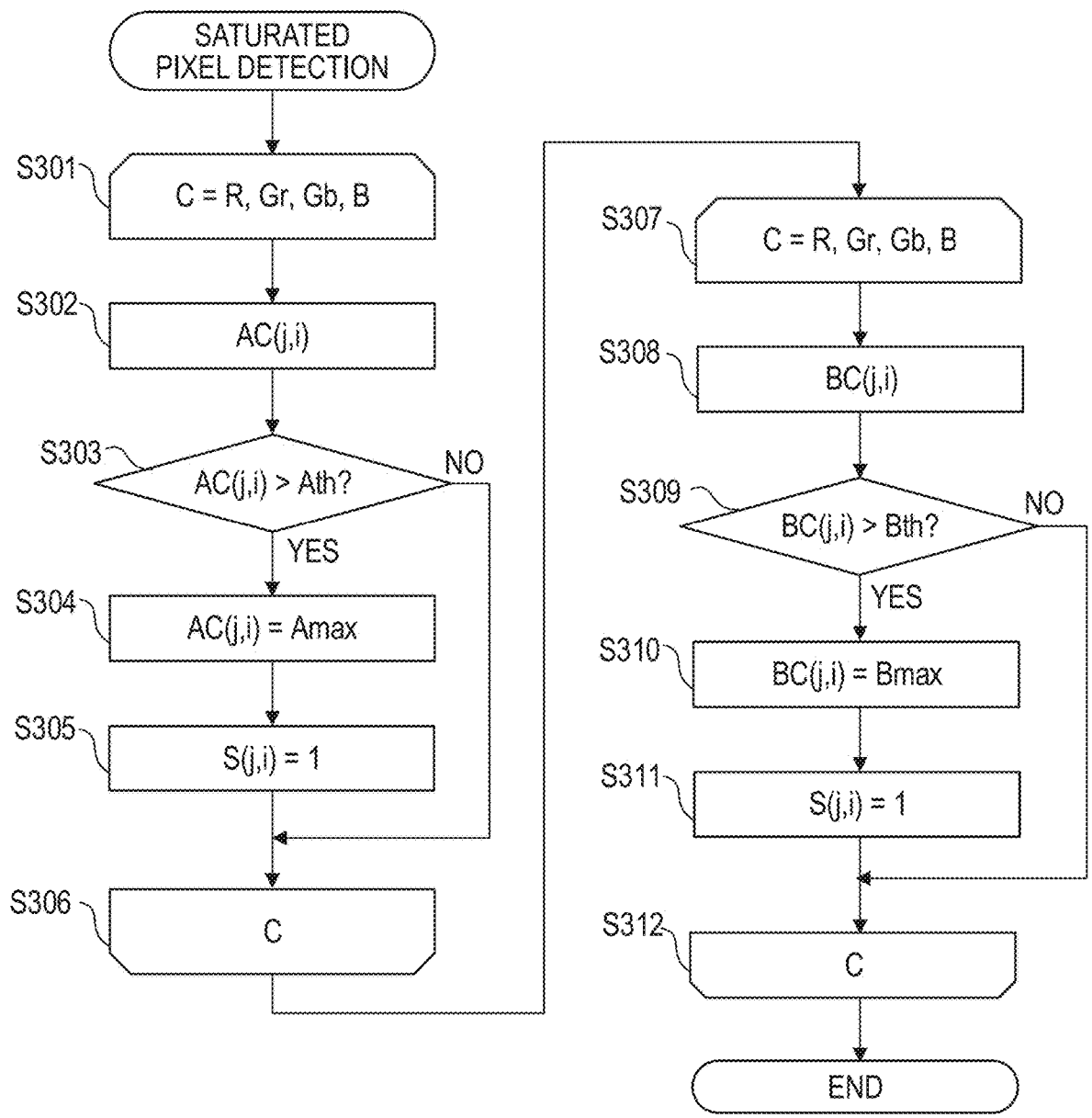
FIG. 12 is a flowchart of saturated-pixel detection performed by the imaging apparatus according to the first embodiment.

Next, the saturation determination process of step S105 in FIG. 9 will be described in detail by using FIG. 10 to FIG. 12. FIG. 10 is a schematic diagram illustrating the index provided to focus detection signals read out in the second scan. FIG. 10 is a schematic diagram in which the acquired focus detection signals are formed in a matrix by rearranging rows in the order of acquisition. The character "i" denotes the index of the column number provided to focus detection signals, and the character "j" denotes the index of the row number provided to focus detection signals. The characters "R", "Gr", "Gb", and "B" each are the index corresponding to the color of the color filter of each pixel (color index). Note that, while formed in the Bayer arrangement in the example of FIG. 10, the acquired focus detection signal is not limited thereto. Further, in the following process, while the color indexes are provided to four pixels of R, Gr, Gb, and B and these four pixels are processed as a group, this is not essential, and the process may be performed in a unit of one pixel.

General explanation of the saturation determination process will be provided prior to the description of the specific process. In the present process, the DSP 214 determines whether or not a predetermined threshold is exceeded for each focus detection signal and, if the predetermined threshold is exceeded, determines the signal being saturated and clips the value thereof to a predetermined clip value. The pixel corresponding to the saturated focus detection signal is referred to as "saturated pixel". The focus detection signal processing unit 215 counts the number of saturated pixels detected by the DSP 214 on a row basis, determines whether or not the number of saturated pixels exceeds a predetermined number, and determines the row being saturated if the predetermined number is exceeded. This saturated row is referred to as "saturated row" below.

The saturation determination process will be described with reference to both FIG. 11 and FIG. 12 that is a subroutine of FIG. 11. FIG. 11 is a flowchart of the saturation determination process performed by the imaging apparatus according to the first embodiment. FIG. 12 is a flowchart of the saturated-pixel detection performed by the imaging apparatus according to the first embodiment. The loop from step S201 to step S208 for the row number j is a loop in which determination of saturated rows is performed sequentially for each row from the 0-th row to jmax-th row (the final row of focus detection signals). The loop from step S202 to step S204 for the row number i is a loop in which pixel detection is performed sequentially for each column from the 0-th column to imax-th column (the final row of focus detection signals). Step S203 is a subroutine of the saturated-pixel detection.

While the process of saturated-pixel detection corresponding to step S203 will be described below with reference to FIG. 12, the terms illustrated in the flowchart of FIG. 12 will be described in advance. The signal A forming a focus detection signal includes four signals AR, AGr, AGb, and AB having color indexes C comprising R, Gr, Gb, and B. The four signals AR, AGr, AGb, and AB at the j-th row and i-th column will be collectively denoted as a signal $AC(j, i)$ below. Further, in a similar manner for the signal B, the four signals BR, BGr, BGb, and BB at the j-th row and i-th column will be collectively denoted as a signal $BC(j, i)$.

In the loop from step S301 to step S306, saturation determination of the signal A is performed for each color of R, Gr, Gb, and B. In step S302, the DSP 214 acquires the signal $AC(j, i)$. In step S303, the DSP 214 determines whether or not the signal $AC(j, i)$ is greater than a saturation determination threshold Ath for the signal A. If the signal $AC(j, i)$ is greater than the saturation determination threshold Ath for the signal A (step S303, YES), the process proceeds to step S304. If the signal $AC(j, i)$ is less than or equal to the saturation determination threshold Ath for the signal A (step S303, NO), the process of steps S304 and S305 is not performed.

In step S304, the DSP 214 clips the signal $AC(j, i)$ to the saturation clip value Amax by substituting a saturation clip value Amax of the signal A into the signal $AC(j, i)$. In step S305, the DSP 214 substitutes 1 into a saturated-pixel determination value $S(j, i)$. Note that, when 1 is not substituted into the saturated-pixel determination value $S(j, i)$, the saturated-pixel determination value $S(j, i)$ is maintained to 0 that is the initial value.

In the loop from step S307 to step S312, saturation determination of the signal B is performed for each color of R, Gr, Gb, and B. In step S308, the DSP 214 acquires the signal $BC(j, i)$. In step S309, the DSP 214 determines whether or not the signal $BC(j, i)$ is greater than a saturation determination threshold Bth for the signal B. If the signal $BC(j, i)$ is greater than the saturation determination threshold Bth for the signal B (step S309, YES), the process proceeds to step S310. If the signal $BC(j, i)$ is less than or equal to the saturation determination threshold Bth for the signal B (step S309, NO), the process of steps S310 and S311 is not performed.

In step S310, the DSP 214 clips the signal $BC(j, i)$ to the saturation clip value Bmax by substituting a saturation clip value Bmax of the signal B into the signal $BC(j, i)$. In step S311, the DSP 214 substitutes 1 into a saturated-pixel determination value $S(j, i)$.

According to the above process, if at least one of the four signals AR, AGr, AGb, and AB and four signals BR, BGr, BGb, and BB at the j-th row and the i-th column is saturated and exceeds the threshold, the value of saturated-pixel determination value S(j, i) is 1. Further, a saturated signal is clipped to a predetermined saturation clip value.

Turning back to FIG. 11, the subsequent part of the saturation determination process will be described. In step S205, the focus detection processing unit 215 calculates the number of the saturated pixels on the j-th row and determines whether or not the number of saturated pixels is greater than a threshold Sth. If the number of saturated pixels is greater than the threshold Sth (step S205, YES), the process proceeds to step S206, and the focus detection signal processing unit 215 substitutes 1 into a saturated-row determination value L(j). If the number of saturated pixel is less than or equal to the threshold Sth (step S205, NO), the process proceeds to step S207, and the focus detection signal processing unit 215 substitutes 0 into the saturated-row determination value L(j).

According to the above process, if the number of saturated pixels is greater than a predetermined threshold, that is, for a saturated row, then the value of the saturated-row determination value L(j) is 1, and for not-saturated rows, the value of the saturated-row determination value L(j) is 0. In such a way, determination whether or not a row is a saturated row is performed for each row.

Figure 13:
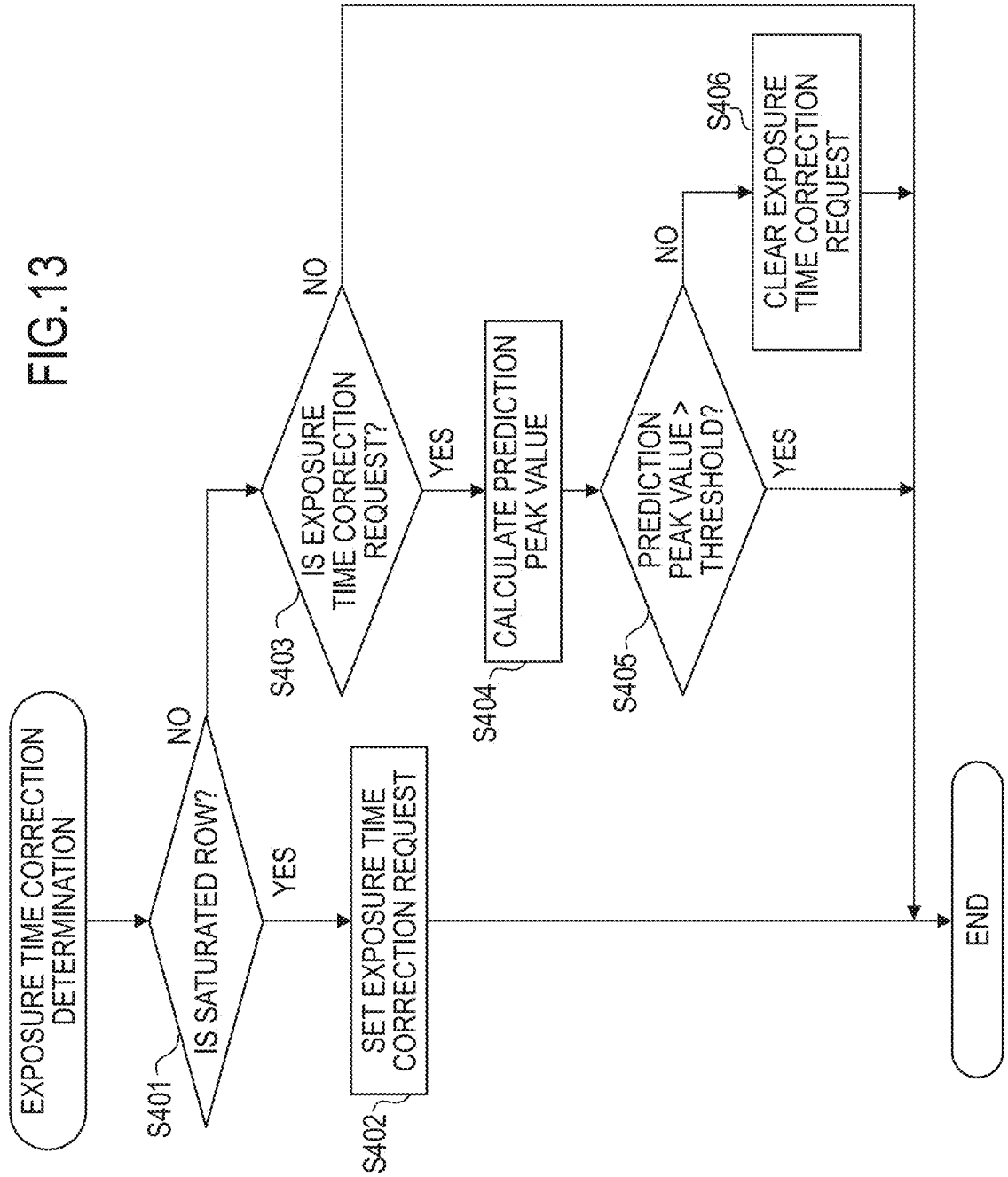
FIG. 13 is a flowchart of exposure time correction determination according to the first embodiment.
Figure 14:
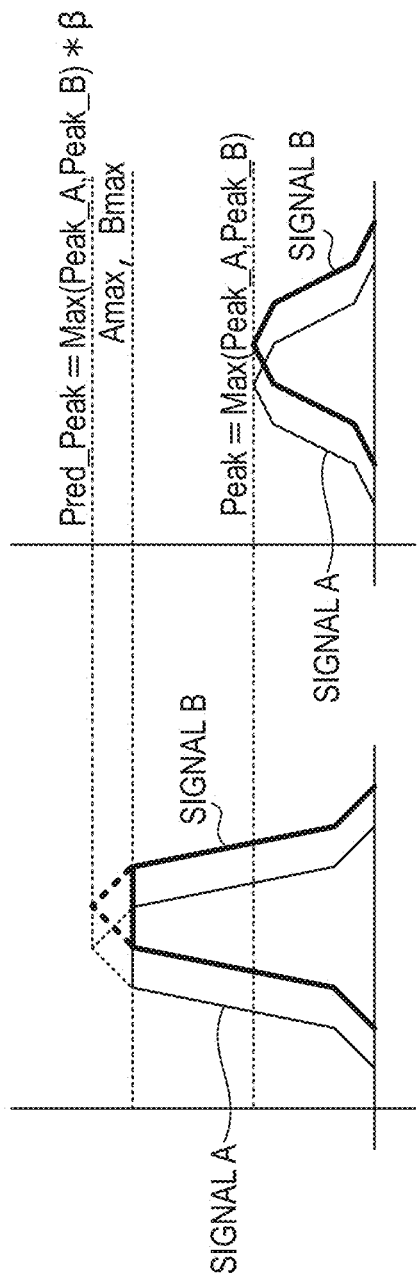
FIG. 14A and FIG. 14B are schematic diagrams illustrating calculation of a prediction peak value of a signal A and a signal B according to the first embodiment.

Next, the exposure time correction determination of step S107 in FIG. 9 will be described in more detail by using FIG. 13 to FIG. 15. FIG. 13 is a flowchart of the exposure time correction determination according to the first embodiment. In step S401, the camera control unit 224 determines whether or not there is at least one saturated row of L(j)=1 for the saturated-row determination value L(j) obtained in the saturation determination process described above. If there is at least one saturated row (step S401, YES), the process proceeds to step S402. If there is no saturated row (step S401, NO), the process proceeds to step S403.

In step S402, the camera control unit 224 sets the exposure time correction request so that the exposure time of the second scan is shorter than the exposure time of the first scan and ends the exposure time correction determination. Note that the exposure time correction request once set is held until it is cleared by a process described later or until the motion image capturing process ends.

In step S403, the camera control unit 224 determines whether or not the exposure time correction request has been set in the previous frame. If the exposure time correction request has been set (step S403, YES), the process proceeds to step S404. If the exposure time correction request has not been set (step S403, NO), the camera control unit 224 ends the exposure time correction determination without setting the exposure time correction request.

In step S404, the camera control unit 224 that functions as a prediction unit calculates a prediction peak value. This process will be described in detail with reference to FIG. 14A, FIG. 14B, and FIG. 15. FIG. 14A and FIG. 14B are schematic diagrams illustrating calculation of the prediction peak value for the signal A and the signal B according to the first embodiment. FIG. 15 is a table illustrating a magnification β of the peak value corresponding to the difference in the exposure time.

Each vertical axis of FIG. 14A and FIG. 14B represents the intensity of signals corresponding to a light amount, and each horizontal axis represents the position in the imaging plane. When the exposure time of the first scan is denoted as TV and the exposure time of the second scan is denoted as AFTV, the solid lines of FIG. 14A represent the signal A and the signal B in the case of AFTV=TV. The sections illustrated by dashed lines of the signal A and the signal B represent sections clipped by the saturation clip values Amax and Bmax due to the saturation determination value being exceeded. That is, FIG. 14A illustrates the signal A and the signal B in a saturated state. On the other hand, FIG. 14B illustrates the signal A and the signal B in a state where the exposure time is corrected to obtain AFTV<TV. Note that, while FIG. 14A is depicted under the assumption that the saturation clip value and the saturation determination threshold value are the same value, the saturation clip value and the saturation determination threshold value may be different values from each other.

The condition to reach step S404 is that the signal A and the signal B are saturated as illustrated in FIG. 14A in any frame before the current frame and, further, the signal A and the signal B are not saturated as illustrated in FIG. 14B in the current frame. When this condition is met, the prediction peak value of step S404 is calculated.

The peak value of the signal A is denoted as Peak_A, and the peak value of the signal B is denoted as Peak_B. The prediction peak value is resulted by clearing the exposure time correction request and calculating and predicting the maximum value (Pred_Peak) of the peak values to obtain TV=AFTV from the maximum value of the peak values of the signal A and the signal B (Peak=Max(Peak_A, Peak_B)). The prediction peak value Pred_Peak can be obtained by multiplying the Peak by the magnification β corresponding to the difference between the exposure time of the first scan and the exposure time of the second scan (AFTV−TV) as exemplified in FIG. 15. That is, Pred_Peak=Max(Peak_A, Peak_B)*β. In FIG. 15, the value of (AFTV−TV) is illustrated as a value normalized such that the exposure time corresponding to one-eighth step of the exposure value becomes 1. The magnification β can be obtained by measuring in advance changes of the peak values of the signal A or the signal B when the exposure time is changed, creating and storing a table in the ROM 222, and reading out the table in calculation. Further, the magnification β can be calculated by storing in advance a conversion expression of (AFTV−TV) and the magnification β in the ROM 222 and using the conversion expression by the camera control unit 224 in calculation, rather than using a table.

In step S405, the camera control unit 224 determines whether or not the prediction peak value Pred_Peak calculated in step S404 exceeds a threshold. If the prediction peak value Pred_Peak exceeds the threshold (step S405, YES), the exposure time correction request is maintained in a set state, and the process of exposure time correction determination ends. This is because a longer exposure time AFTV may cause saturation when the prediction peak value Pred_Peak exceeds the threshold and therefore the exposure time correction request has to be maintained in a set state. On the other hand, if the prediction peak value Pred_Peak is less than or equal to the threshold (step S405, NO), the process proceeds to step S406. This is because it is determined that no saturation occurs even with a longer exposure time AFTV. In step S406, the camera control unit 224 clears the exposure time correction request and ends the process of exposure time correction determination.

Note that the threshold used in step S405 can be the saturation clip value Amax or Bmax or the saturation determination value Ath or Bth, for example. Further, the threshold may be a value smaller than the saturation clip value Amax or Bmax or the saturation determination value Ath or Bth taking a margin into consideration or may be a threshold varying in accordance with (AFTV−TV).

The advantages of the present embodiment will be described. When a focus detection signal is acquired for a high brightness subject, the focus detection signal may be saturated. When the focus detection signal is saturated, while it is possible to perform a process of focus detection by clipping the signal to a predetermined value as described in the above embodiment, an edge that does not exist on the actual subject may occur between the clipped signal and a not-clipped signal. Thus, when an image displacement is calculated based on the clipped focus detection signal, a correct defocus value cannot be acquired, and a position that is different from a true focus position may be determined as a focus. Accordingly, saturation of a focus detection signal may cause deterioration of the focus detection accuracy. To address this, when saturation is suppressed by reducing the exposure by using a method such as reduction in the accumulation time, adjustment of an aperture, or the like, the accuracy of focus detection may be improved, however, the exposure of an imaging signal may decrease and thus the exposure for image capturing may be shifted from a suitable value.

In contrast, in the present embodiment, it is possible to separately set the exposure time of the first scan for performing acquisition of an imaging signal and the exposure time of the second scan for performing acquisition of a focus detection signal. By controlling the exposure time of the second scan to be shorter than the exposure time of the first scan when saturation of the focus detection signal is detected, it is possible to suppress saturation of the focus detection signal while maintaining capturing at a suitable exposure, which can improve the accuracy of focus detection.

Further, in the present embodiment, whether or not to clear an exposure time correction request is determined based on the peak value predicted when the exposure time of the focus detection pixel and the exposure time of the imaging pixel are set to the same. This enables acquisition of a focus detection signal at a suitable exposure time corresponding to the brightness of a subject.

While the determination as to whether or not to clear an exposure time correction request is performed by the process having two steps of calculating a prediction peak value Pred_Peak in step S404 and comparing the prediction peal value Pred_Peak with a threshold in step S405 in the present embodiment, the way of determination is not limited thereto. By configuring this process with more steps, it is possible to acquire a more suitable exposure time. As a specific example, a process of calculating the AFTV closest to the TV within a range not exceeding the threshold may be performed by repeating a process of comparing a threshold with the prediction peak value Pred_Peak when shifting the AFTV closer to the TV by a predetermined amount for several times.

While three signals of the signal A+B, which is an imaging signal, and the signals A and the signal B, which are used for focus detection, are acquired in the scan method of the present embodiment, the scan method is not limited thereto. In order to reduce processing load, for example, an imaging signal and a focus detection signal may be acquired by a scheme of reading out two signals of the signal A+B and the signal A and generating the signal B by calculating the difference between the signal A+B and the signal A.

Second Embodiment

A second embodiment of the present invention will be described below. In the description of the present embodiment, portions common to the first embodiment may be omitted or simplified. The second embodiment is different from the first embodiment in that the exposure time of the second scan is set to be shorter than the exposure time of the first scan in accordance with detection of a subject movement. While the configuration of an imaging apparatus of the present embodiment is substantially the same as that of the first embodiment and thus the description thereof will be omitted, the camera control unit 224 of the present embodiment has a function as a subject movement determination unit that determines a subject movement. Further, the imaging apparatus may further have a movement detection device such as an acceleration sensor, an angular velocity sensor, or the like for detecting a subject movement.

Figure 16:
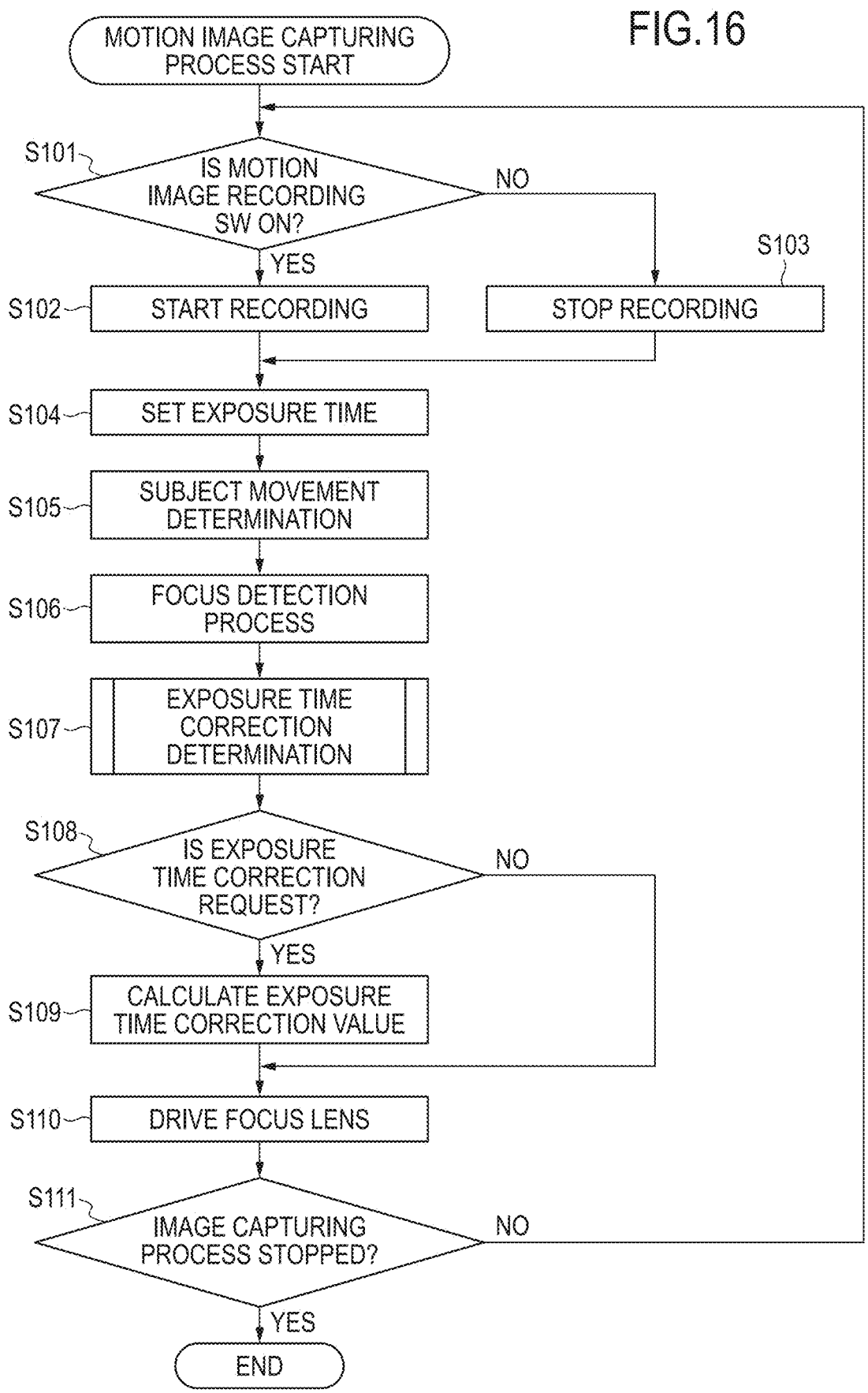
FIG. 16 is a flowchart of a motion image capturing process performed by an imaging apparatus according to a second embodiment.

FIG. 16 is a flowchart of a motion image capturing process performed by the imaging apparatus according to the second embodiment. The differences from FIG. 9 are that subject movement determination (step S505) is performed instead of the saturation determination and that the detail of the exposure time correction determination (step S507) is different. Since other operations are the same as those in FIG. 9, the description will be omitted.

In step S505, the camera control unit 224 that functions as a subject movement determination unit determines whether or not there is a subject movement in a focus detection signal read out in the second scan. The determination of a subject movement may not be performed by analyzing a focus detection signal. For example, the determination of a subject movement can be performed based on whether or not the setting or the capturing condition of the imaging apparatus is in a state where a subject movement is likely to occur. Further, the determination of a subject movement may be performed by detecting a movement of the imaging apparatus.

For example, an example of a case where the setting of the imaging apparatus is likely to cause a subject movement may include a case where a capture mode is a mode intended to capture a moving subject. The mode intended to capture a moving subject may be, for example, a servo mode that continuously performs focus detection to a subject, a capture mode for panning, a capture mode for sports, or the like. An example of the case where a capturing condition is likely to cause a subject movement may be a case where an image stabilization function is off, a case where the brightness of a capturing environment is low, or the like. An example of a case where shake of the imaging apparatus is detected is a case where a movement detection sensor such as an acceleration sensor, an angular velocity sensor, or the like provided on the lens unit 20 or the camera 21 detects a movement and the camera control unit 224 receives the output signal therefrom.

Figure 17:
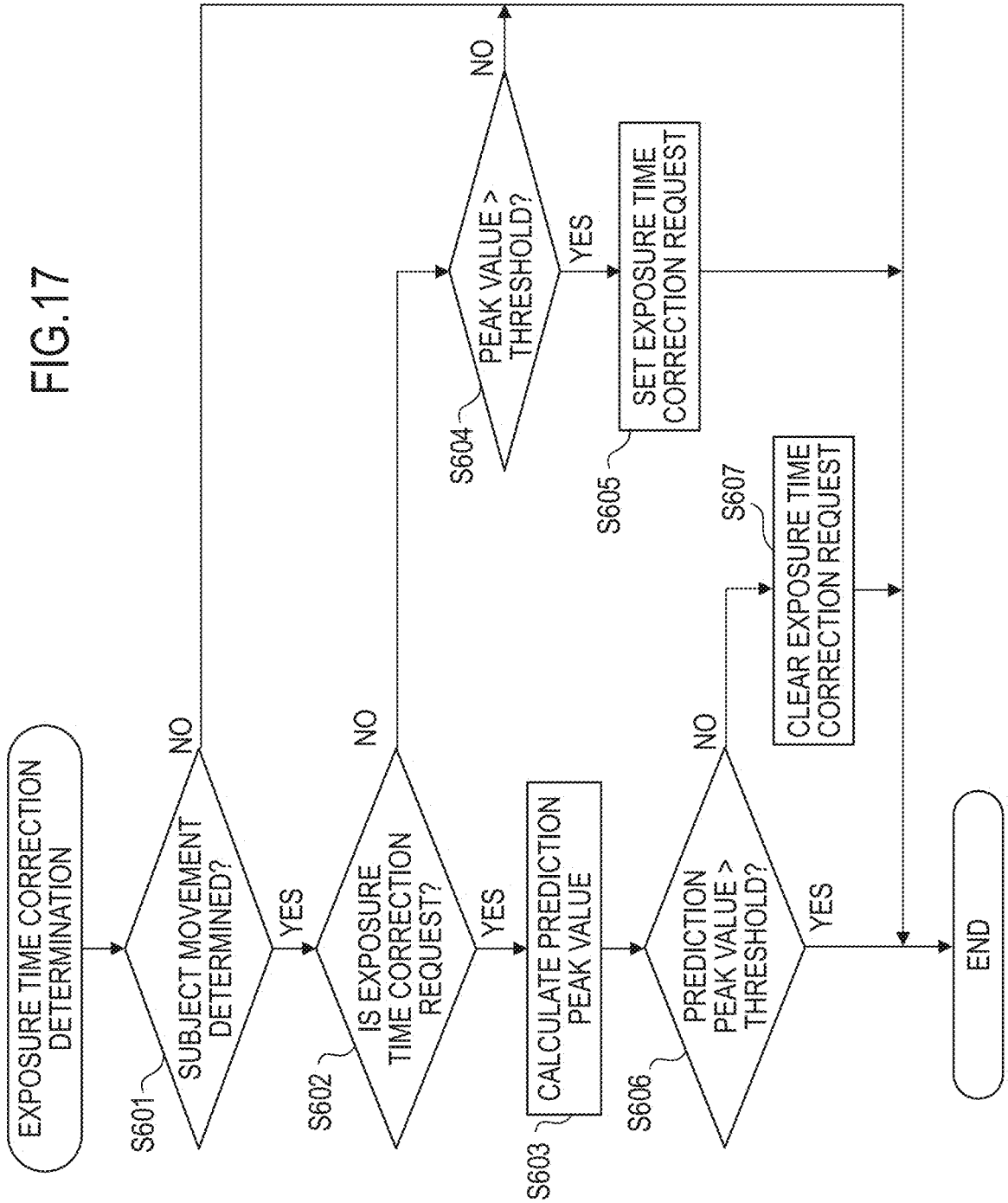
FIG. 17 is a flowchart of exposure time correction determination according to the second embodiment.

In step S507, the camera control unit 224 that functions as a determination unit determines whether or not to correct the exposure time of the second scan to be shorter than the exposure time of the first scan based on the result of the subject movement determination in step S505 and the peak values of the signal A and the signal B acquired in step S106. The exposure time correction determination will be described in more detail with reference to FIG. 17, FIG. 18A, and FIG. 18B. FIG. 17 is a flowchart of the exposure time correction determination according to the second embodiment. FIG. 18A and FIG. 18B are schematic diagrams illustrating calculation of a prediction peak value of the signal A and the signal B according to the second embodiment.

In step S601, the camera control unit 224 determines whether or not it has been determined that there is a subject movement in the subject movement determination described above. If a subject movement has been determined (step S601, YES), the process proceeds to step S602. If no subject movement has been determined (step S601, NO), the process ends.

In step S602, the camera control unit 224 determines whether or not an exposure time correction request has been set in the previous frame. If an exposure time correction request has been set (step S602, YES), the process proceeds to step S603. If no exposure time correction request has been set (step S602, NO), the process proceeds to step S604.

In step S604, the camera control unit 224 determines whether or not the maximum value (Peak) of the peak values of the signal A and the signal B exceeds a predetermined threshold. If the peak value exceeds the threshold (step S604, YES), the process proceeds to step S605. If the peak value is less than or equal to the threshold (step S604, NO), the process of the exposure time correction determination ends. In step S605, the camera control unit 224 sets the exposure time correction request so that the exposure time of the second scan is shorter than the exposure time of the first scan and ends the exposure time correction determination. Note that the exposure time correction request once set is held until it is cleared by a process described later or until the motion image capturing process ends.

In step S603, the camera control unit 224 calculates a prediction peak value. This process will be described in detail with reference to FIG. 18A and FIG. 18B. FIG. 18A illustrates the signal A and the signal B in the case of AFTV=TV. On the other hand, FIG. 18B illustrates the signal A and the signal B in a state where the exposure time has been corrected to AFTV<TV. A difference from FIG. 14A and FIG. 14B of the first embodiment is that the signal A and the signal B are not saturated in FIG. 18A.

The prediction peak value is resulted by clearing the exposure time correction request and calculating and predicting the maximum value (Pred_Peak) of the peak values to obtain TV=AFTV from the maximum value (Peak) of the peak values of the signal A and the signal B in the same manner as the description in the first embodiment. Since the feature that the Pred_Peak is obtained by multiplying the Peak by the magnification β is the same as that described in the first embodiment, the detailed description thereof will be omitted.

In step S606, the camera control unit 224 determines whether or not the prediction peak value Pred_Peak calculated in step S603 exceeds a threshold. If the prediction peak value Pred_Peak exceeds the threshold (step S606, YES), the process of the exposure time correction determination ends while the exposure time correction request is maintained in a set state. This is because, since a longer exposure time AFTV may cause deterioration of the accuracy of focus detection due to a subject movement when the prediction peak value Pred_Peak exceeds the threshold, the exposure time correction request has to be maintained in a set state. On the other hand, if the prediction peak value Pred_Peak is less than or equal to the threshold (step S606, NO), the process proceeds to step S607. This is because it is determined that deterioration in the accuracy of focus detection due to a subject movement is not a problem even when the exposure time AFTV is increased. In step S607, the camera control unit 224 clears the exposure time correction request and ends the process of the exposure time correction determination.

The advantage of the present embodiment will be described. A subject movement may occur when a subject is a moving subject or when imaging apparatus shakes due to a hand movement or the like. When focus detection is performed by a phase difference detection scheme in this state, an insufficient accuracy of focus detection may be obtained due to the subject movement overlapping with image displacement. To address this, reduction in the accumulation time allows for a smaller subject movement and thereby the accuracy of focus detection may be improved, the exposure of an imaging signal may decrease and thus the exposure for image capturing may be shifted from a suitable value.

In contrast, in the present embodiment, it is possible to separately set the first scan for performing acquisition of an imaging signal and the second scan for performing acquisition of a focus detection signal. By controlling the exposure time of the second scan to be shorter than the exposure time of the first scan when a subject movement is detected, it is possible to suppress saturation of the focus detection signal while maintaining capturing at a suitable exposure, which can improve the accuracy of focus detection.

Further, in the present embodiment, whether or not to clear an exposure time correction request is determined based on the peak value predicted when the exposure time of the focus detection pixel and the exposure time of the imaging pixel are set to the same. This enables acquisition of a focus detection signal at a suitable exposure time corresponding to the brightness of a subject.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, an embodiment in which a part of the configuration of any of the embodiments is added to another embodiment or an embodiment in which a part of the configuration of any of the embodiments is replaced with a part of the configuration of another embodiment is to be considered to be an embodiment to which the present invention can be applied.

This application claims the benefit of Japanese Patent Application No. 2017-076914, filed Apr. 7, 2017, which is hereby incorporated by reference herein in its entirety.

What is claimed is:

1. An imaging apparatus comprising:
a plurality of pixels; and
at least one processor or circuit programmed to function as:
a scan unit configured to perform a first scan that outputs, from a first pixel of the plurality of pixel, a first signal based on a light flux that has passed through a first region of an exit pupil of imaging optics and a second scan that outputs, from a second pixel of the plurality of pixels, a second signal based on a light flux that has passed through a second region that is a part of the first region;
a prediction unit configured to predict a value of the second signal;
a determination unit configured to determine whether or not to set a second exposure time of the second pixel to be shorter than a first exposure time of the first pixel based on the value of the second signal predicted by the prediction unit; and
an exposure time setting unit configured to set the first exposure time and the second exposure time based on a determination result of the determination unit,
wherein, when the value predicted by the prediction unit exceeds a predetermined threshold, the determination unit determines to set the second exposure time to be shorter than the first exposure time.

2. The imaging apparatus according to claim 1,
wherein the at least one processor or circuit is further programmed to function as a saturation determination unit configured to determine saturation of the second signal,
wherein, when the saturation determination unit determines that the second signal is saturated, the determination unit determines to set the second exposure time to be shorter than the first exposure time.

3. The imaging apparatus according to claim 1, wherein the prediction unit predicts the value of the second signal when the first exposure time and the second exposure time are the same.

4. The imaging apparatus according to claim 1, wherein the prediction unit predicts the value of the second signal when the first exposure time and the second exposure time are the same,
wherein, when the value predicted by the prediction unit is less than or equal to a predetermined threshold, the determination unit determines to set the first exposure time and the second exposure time to the same.

5. The imaging apparatus according to claim 3, wherein the predetermined threshold is a value at which the second signal is saturated.

6. The imaging apparatus according to claim 1,
wherein the plurality of pixels are arranged to form a plurality of rows, and
wherein the first pixel and the second pixel are arranged on different rows from each other.

7. The imaging apparatus according to claim 1,
wherein the at least one processor or circuit is further programmed to function as a subject movement determination unit configured to determine a subject movement in the second signal,
wherein, when the subject movement determination unit determines that the subject movement is present, the determination unit determines to set the second exposure time to be shorter than the first exposure time.

8. The imaging apparatus according to claim 7, wherein the subject movement determination unit determines the subject movement based on an image capture mode.

9. The imaging apparatus according to claim 7 further comprising a movement detection sensor configured to detect a movement of the imaging apparatus,
wherein the subject movement determination unit determines the subject movement based on an output from the movement detection sensor.

10. The imaging apparatus according to claim 1, wherein the first signal is a signal used for generating an image.

11. The imaging apparatus according to claim 1, wherein the second signal is a signal used for focus detection of a phase difference detection scheme.

12. A control method of an imaging apparatus, the control method comprising:
performing a first scan that outputs, from a first pixel of a plurality of pixel, a first signal based on a light flux that has passed through a first region of an exit pupil of imaging optics and a second scan that outputs, from a second pixel of the plurality of pixels, a second signal based on a light flux that has passed through a second region that is a part of the first region;
predicting a value of the second signal;
determining whether or not to set a second exposure time of the second pixel to be shorter than a first exposure time of the first pixel based on the value of the second signal predicted by the prediction unit; and
setting the first exposure time and the second exposure time based on a determination result of the step of determining,
wherein, when the predicted value exceeds a predetermined threshold, the second exposure time is set to be shorter than the first exposure time.

* * * * *